(12) United States Patent
Kimura et al.

(10) Patent No.: US 8,009,228 B2
(45) Date of Patent: Aug. 30, 2011

(54) CAMERA AND DIRECTION INDICATING SWITCH

(75) Inventors: Tomonori Kimura, Machida (JP);
Kimiharu Yanagisawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 12/216,572

(22) Filed: Jul. 8, 2008

(65) Prior Publication Data

US 2009/0015709 A1    Jan. 15, 2009

(30) Foreign Application Priority Data

Jul. 12, 2007 (JP) ................... 2007-182779
Feb. 13, 2008 (JP) ................... 2008-031593

(51) Int. Cl.
*H04N 5/225* (2006.01)
*G03B 17/00* (2006.01)

(52) U.S. Cl. ............. 348/374; 348/373; 396/297
(58) Field of Classification Search .......... 348/374–375; 396/297–300
See application file for complete search history.

(56) References Cited

U.S. PATENT DOCUMENTS 7,538,792 B2 * 5/2009 Takahashi ............... 348/207.1
2003/0030742 A1 * 2/2003 Ike ........................... 348/354
2005/0200737 A1    9/2005 Shinohara et al.
2006/0244838 A1 * 11/2006 Arbogast ................. 348/211.4

FOREIGN PATENT DOCUMENTS

JP        6-260056     9/1994
JP        2004-151405  5/2004

* cited by examiner

*Primary Examiner* — Kelly L Jerabek
(74) *Attorney, Agent, or Firm* — Dickstein Shapiro LLP

(57) ABSTRACT

A camera includes a direction indicating switch to specify an arbitrary indicating direction which is attached to a case member. The direction indicating switch has a switch base having a contact point which is capable of abutting intermittently; an operating section held by the switch base to be capable of tilting for tilting for intermittently abutting of the contact point; and a tilt controlling section which controls a tilt of the operating section. The operating section is capable of tilting in a radial direction from a reference position where the contact point is in a nonconductive state. When the operating section is tilted over a predetermined angle from the reference position, the contact point is in a conductive state. The tilt controlling section allows the operating section to tilt over the predetermined angle in a predetermined indicating direction from the reference position and prevents the operating section from tilting over the predetermined angle in a direction different from the predetermined indicating direction from the reference position.

14 Claims, 30 Drawing Sheets

CAMERA AND DIRECTION INDICATING SWITCH

CROSS REFERENCE TO RELATED APPLICATIONS

The present application is based on and claims priority from Japanese Application Numbers 2007-182779, filed on Jul. 12, 2007, and 2008-031593, filed on Feb. 13, 2008, the disclosures of which are hereby incorporated by reference herein in their entirety.

BACKGROUND

The present invention relates to a camera equipped with a direction indicating switch, and to the direction indicating switch thereof.

A known camera, for example, is provided with a direction indicating switch which is capable of specifying a crisscross direction, in which an up-and-down direction and a right-and-left direction intersect one another, as an operation button. As for the camera as described above, it is possible to selectively perform various desired functions by operating the direction indicating switch and accordingly specifying up, down, right and left directions.

For example, Japanese Patent Publication No. H06-260056 discloses that there is a direction indicating switch as described above, in which the direction indicating switch has an operating section provided with indicating parts for each operation of up, down, right, and left on a surface side, four piezoelectric switches provided in positions matching with each indicating part, and a base board with an axis member extended out to a center of each of the piezoelectric switches. And additionally, in the operating section, a center position of both up-and-down and right-and-left operation directions is supported by the axis member from a reverse side, and spots (four corners) corresponding to each indicating part are supported by each piezoelectric switch from the reverse side. Each of these piezoelectric switches has a biasing member which is capable of returning to a nonconductive state, and is structured to be in a conductive state by being pressed down against the biasing member.

As for this direction indicating switch, in a state where the operating section is not pressed, each piezoelectric switch returns to the nonconductive state by a biasing force of the biasing member, and the operating section is at a reference position. When the indicating part of the operating section is pressed against the biasing force of the biasing member of each piezoelectric switch, the operating section tilts from the reference position in regard to a support point by the axis member as a fulcrum and the piezoelectric switch corresponding to the indicating part (which is placed on a side where the operating section is tilted.) is pressed, and the indicating part is in the conductive state. Therefore, it is possible for the direction indicating switch to selectively press down each piezoelectric switch and to specify indicating directions of up, down, right and left by accordingly tilting the operating section.

However, as for the direction indicating switch described above, the operating section is supported at the four corners by the four piezoelectric switches which are capable of pressing down, and thereby it is possible to tilt in radial directions on a surface including the up-and-down and the right-and-left directions in regard to a center position (the support point) supported by the axis member as the fulcrum. Therefore, there is a possibility that the operating section may perform a so-called operational error, for example, the operating section may not be tilted in an appropriate direction (directions where each indicating part is provided.). And then the direction indicating switch may specify an indicating direction against an operator's intention and the indicating direction may not be specified though the operating section is tilted. In particular, when using a camera, there is a situation when the direction indicating switch is operated while a user looks in an optical finder, and in a situation like this, there may be a higher possibility for the operational error caused by a tilt operation without looking at the direction indicating switch.

SUMMARY

An object of the present invention is to provide a camera having the direction indicating switch which is capable of preventing the operating section from tilting in a direction different from an appropriate direction, that is, preventing a so-called operational error.

A camera according to an embodiment of the present invention comprises: an operating switch which sends an instruction to a controlling mechanism, wherein the operating switch includes: an operating section which is capable of tilting to the camera; a switching section which switches a conductive state of a contact point connecting with the controlling mechanism by tilting of the operating section; and a tilt controlling section which controls a tilt of the operating section, wherein the tilt controlling section controls the operating section to tilt in a predetermined direction.

Preferably, the operating switch includes: an operating section which is capable of tilting to the camera; a switching section which switches a conductive state of a contact point connecting with the controlling mechanism by a tilt of the operating section in a predetermined indicating direction from a reference position; and a tilt controlling section which controls the operating section to tilt over a predetermined angle from a predetermined reference position, wherein the tilt controlling section allows the operating section to tilt in the predetermined indicating direction from the reference position and controls the operating section to tilt in a direction different from the predetermined indicating direction from the reference position.

Preferably, the operating section, when the operating section is at the reference position, makes the contact point be in a nonconductive state, and when the operating section is tilted over a predetermined angle in the predetermined indicating direction from the reference position, the operating section makes the contact point be in a conductive state, and the tilt controlling section allows the operating section to tilt over the predetermined angle in the predetermined indicating direction from the reference position and prevents the operating section from tilting over the predetermined angle in the direction different from the predetermined indicating direction from the reference position.

Preferably, the operating switch is a direction indicating switch to specify an arbitrary indicating direction and attached to a case member, wherein the direction indicating switch includes: a switch base having a contact point which is capable of abutting intermittently; an operating section held by the switch base to be capable of tilting for abutting intermittently of the contact point; and a tilt controlling section which controls a tilt of the operating section, wherein the operating section is capable of tilting in a radial direction from the reference position where the operating section makes the contact point be in the nonconductive state, and when the operating section is tilted over the predetermined angle in the predetermined indicating direction from the reference position, the operating section makes the contact point be in the conductive state, and the tilt controlling section allows the operating section to tilt over the predetermined angle in the predetermined indicating direction from the reference position and prevents the operating section from tilting over the predetermined angle in the direction different from the predetermined indicating direction from the reference position.

Preferably, the tilt controlling section includes: a plate member provided in the operating section so as to encircle the operating section on a surface orthogonal to an axis of the operating section; and an abutted surface part provided in the case member or the switch base to face and extend in parallel with the plate member when the operating section is at the reference position, wherein the plate member, when the operating section is tilted in the direction different from the predetermined indicating direction from the reference position, abuts on the abutted surface part and thereby prevents the operating section from tilting to the predetermined angle, and when the operating section is tilted in the predetermined indicating direction from the reference position, the plate member allows the operating section to tilt to the predetermined angle without abutting on the abutted surface part.

Preferably, a projected part projected toward the abutted surface part is provided in a position of an opposite direction to the predetermined indicating direction viewed from the reference position on the plate member, and the projected part, when the operating section is tilted in the direction different from the predetermined indicating direction from the reference position, abuts on the abutted surface part and thereby prevents the operating section from tilting to the predetermined angle, and when the operating section is tilted in the predetermined indicating direction from the reference position, the projected member has a length which allows the operating section to tilt to the predetermined angle without abutting on the abutted surface part.

Preferably, an operating cap is attached to the operating section so as to cover an end of the operating section, the operating cap includes: a head part for operation exposed outward from an opening provided in the case member; and a flange part extending continuously from the head part for operation and along the case member inside of the case member, wherein the flange part forms the plate member, and a peripheral wall part which determines the opening in the case member forms the abutted surface part.

Preferably, an operating cap is attached to the operating section so as to cover an end of the operating section, the operating cap includes: a head part for operation exposed outward from an opening provided in the case member; and a flange part extending continuously from the head part for operation and along the case member inside of the case member, wherein the operating cap attaches a sealing member, which is formed by an elastic-deformable material to seal a gap between the opening and the operating cap, and which encircles the head part for operation and extends between the flange part and the case member, and the sealing member forms the plate member, and a peripheral wall part which determines the opening in the case member forms the abutted surface part.

Preferably, a flange projected part projected toward the abutted surface part is provided in a position of an opposite direction to the predetermined indicating direction viewed from the reference position on the flange part.

Preferably, a shielding member, having a projected stand part which is capable of fitting into the opening of the case member, is provided between the operating section and the operating cap, a through-hole having a diameter which is smaller than the head part for operation of the operating cap is provided in the projected stand part, and the flange part of the operating cap is capable of being inserted in the through-hole of the projected stand part and has an uneven diameter which is capable of engaging with the through-hole.

Preferably, the predetermined indicating direction includes four directions orthogonal to each other viewed from the reference position.

An operating switch which sends an instruction to a controlling mechanism according to an embodiment of the present invention, comprises: an operating section which is capable of tilting to the controlling mechanism; a switching section which switches a conductive state of a contact point connecting with the controlling mechanism by tilting in a predetermined indicating direction from a reference position of the operating section; and a tilt controlling section which controls a tilt of the operating section, wherein the tilt controlling section allows the operating section to tilt in the predetermined indicating direction from the reference position and controls the operating section to tilt in a direction different from the predetermined indicating direction from the reference position.

Preferably, the operating section, when the operating section is at the reference position, makes the contact point be in a nonconductive state, and when the operating section is tilted over a predetermined angle in the predetermined indicating direction from the reference position, the operating section makes the contact point be in a conductive state, and the tilt controlling section allows the operating section to tilt over the predetermined angle in the predetermined indicating direction from the reference position and prevents the operating section from tilting over the predetermined angle in the direction different from the predetermined indicating direction from the reference position.

A direction indicating switch to specify an arbitrary indicating direction according to an embodiment of the present invention, comprises: a switch base having a contact point which is capable of abutting intermittently; an operating section held by the switch base to be capable of tilting for abutting intermittently of the contact point; and a tilt controlling section which controls a tilt of the operating section, wherein the operating section is capable of tilting in a radial direction from a reference position where the operating section makes the contact point be in a nonconductive state, and when the operating section is tilted over a predetermined angle in a predetermined indicating direction from the reference position, the operating section makes the contact point be in a conductive state, and the tilt controlling section allows the operating section to tilt over the predetermined angle in the predetermined indicating direction from the reference position and prevents the operating section from tilting over the predetermined angle in a direction different from the predetermined indicating direction from the reference position.

DETAILED DESCRIPTION OF THE PREFERRED EMBODIMENTS

Hereinafter, with reference to drawings, each embodiment of a camera according to the present invention will be explained.

Embodiment 1

Figure 1:
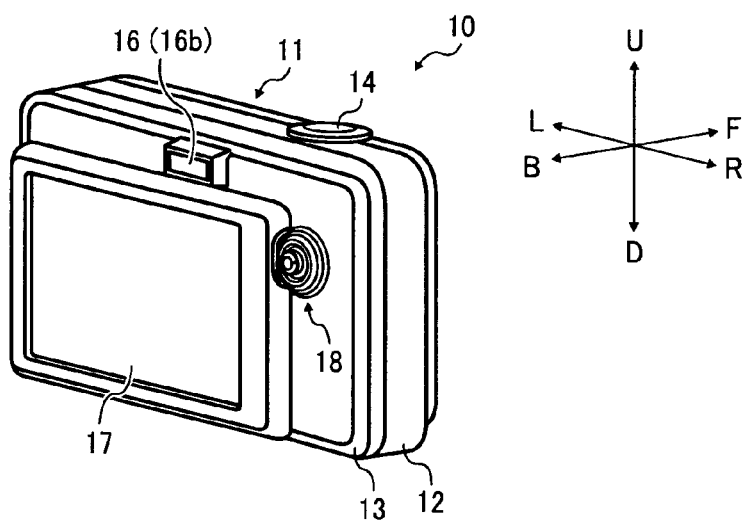
FIG. 1 is a schematic perspective view of a camera according to an embodiment 1 of the present invention from a reverse side.
Figure 2:
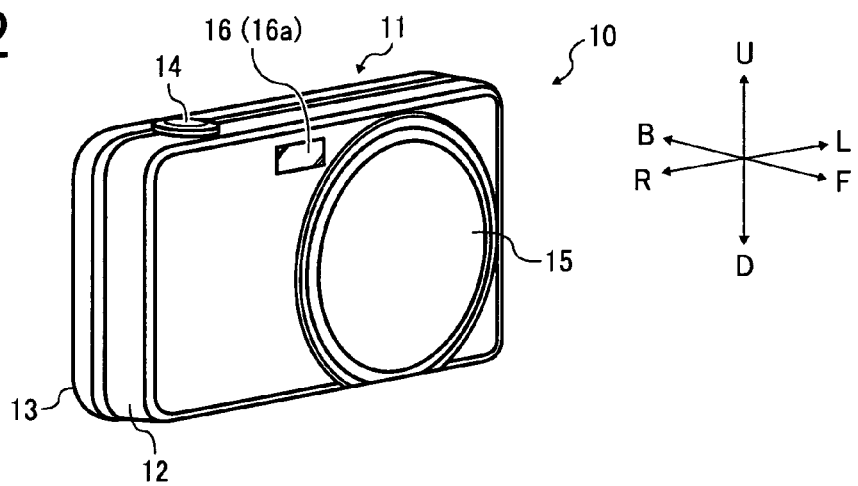
FIG. 2 is a schematic perspective view of the camera according to the embodiment 1 of the present invention from a front side.

FIG. 1 is a schematic perspective view of a camera 10 according to an embodiment 1 of the present invention from a reverse side, and FIG. 2 is a schematic perspective view of the camera 10 from a front side. Hereinafter, the camera 10 is taken as a reference, a direction of a photographing optical axis is taken as a front-and-back direction (a photographing subject side is a front side.) (See an arrow FB), a direction of a height of the camera in a front view is taken as an up-and-down direction (See an arrow UD), and a direction orthogonal to a surface including the front-and-back and up-and-down directions is taken as a right-and-left direction (a left hand side in the front view of the camera is a right direction.) (See an arrow LR).

The camera 10 is a digital camera in the embodiment 1. A camera mechanism, which is not illustrated, functioning as a camera such as for photographing a photographic subject and so on, is stored and structured in a case 11. The camera 10 according to the embodiment 1 is structured such that, in its camera mechanism, an image signal is converted into an electric signal in a CCD (Charge-Coupled Device) image sensor, then the electric signal is digitally processed, and thereby a still image or a moving image of digital image data of the photographic subject is obtained, and the digital image data is stored in a memory card.

The case 11 is structured such that a front case 12 and a back case 13 are coupled in a front-and-back direction. In the front case 12, as described in FIG. 2, a release button 14 is provided on a top surface, and a lens 15 and a front window part 16*a* for an optical finder 16 are provided on a front surface. In the back case 13, as described in FIG. 1, a Liquid Crystal Display (LCD) 17, a back window part 16*b* for the optical finder 16, and a direction indicating switch 18 as an operating switch are provided.

In the camera 10, the direction indicating switch 18 is accordingly operated to choose various functions. The release button 14 is pressed to photograph a photographic subject. In addition, when photographing, it is possible for the camera 10 to photograph a photographic subject with an image of the photographic subject on the LCD 17, and it is also possible to photograph a photographic subject by looking in the optical finder 16.

In the camera 10 according to an embodiment of the present invention, a structure of the direction indicating switch 18 is different from an already-known camera. Hereinafter, the structure of the direction indicating switch 18 will be explained.

Figure 3:
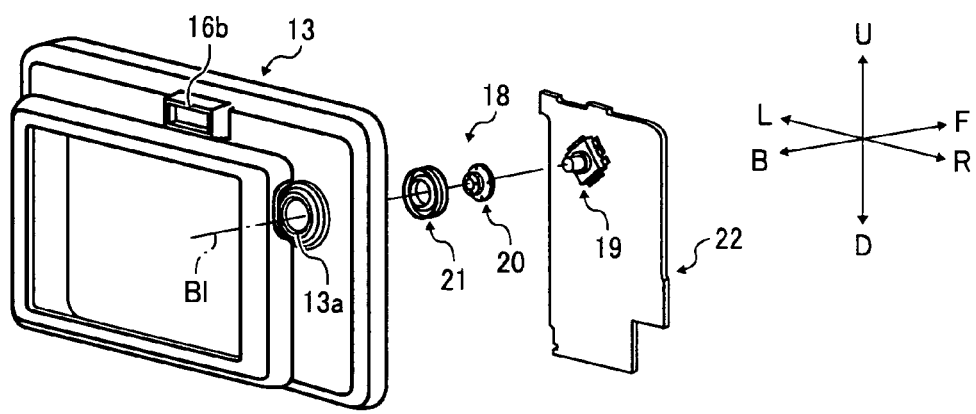
FIG. 3 is an exploded schematic perspective view explaining a peripheral structure of a direction indicating switch.
Figure 4:
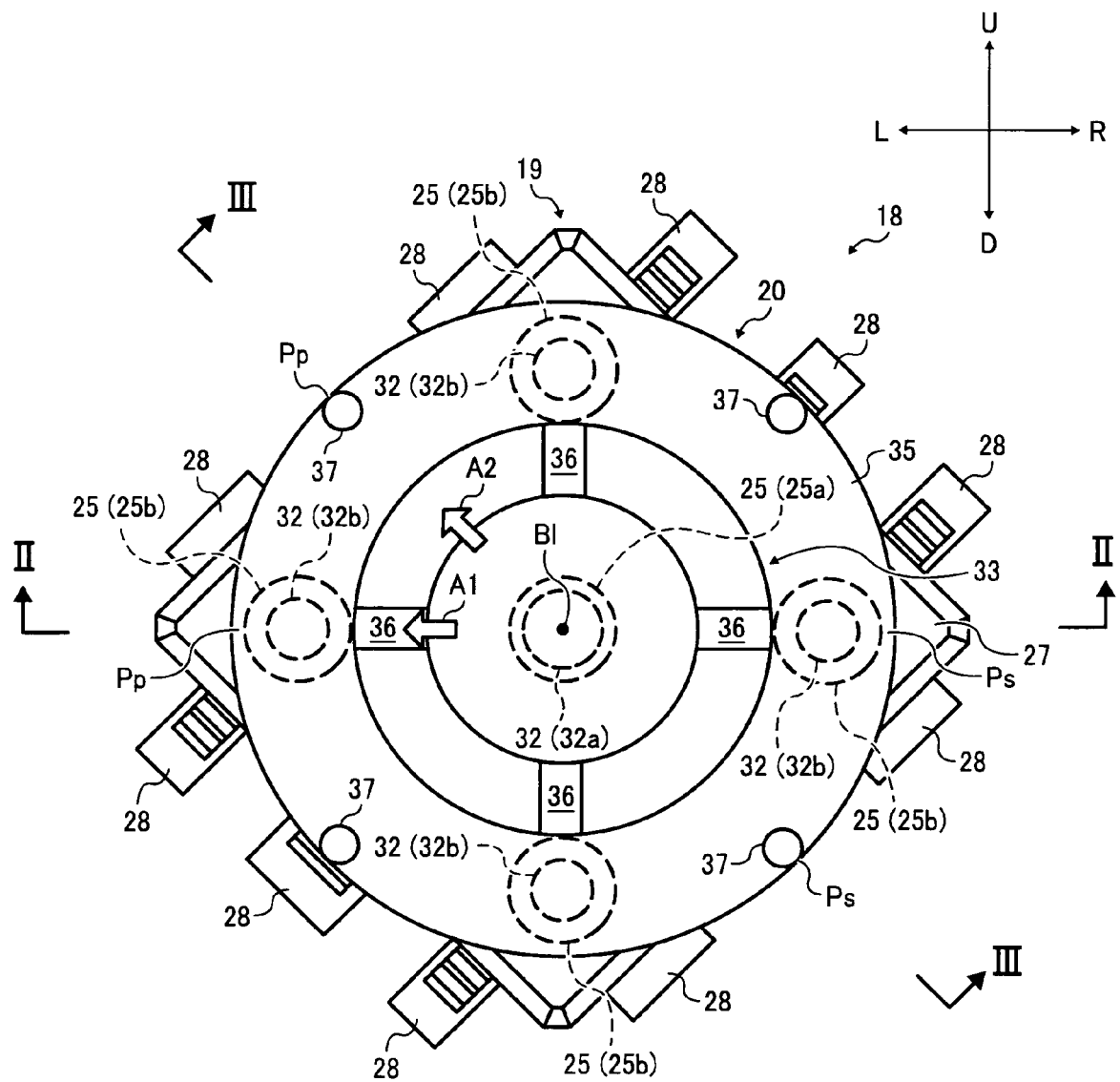
FIG. 4 is a top view of the direction indicating switch from above (from the back when the direction indicating switch is attached to the camera).
Figure 5:
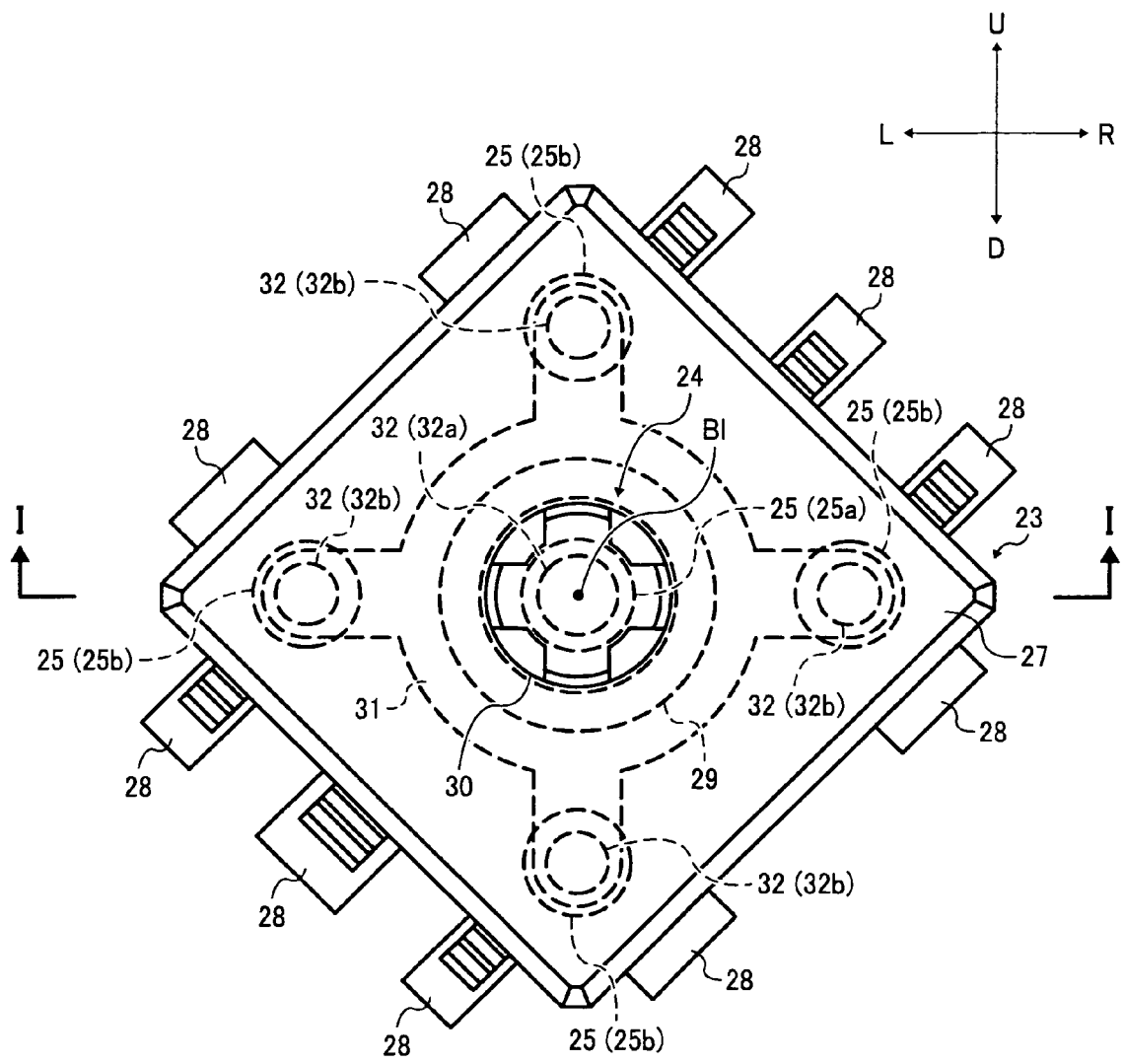
FIG. 5 is a top view of a switching device of the direction indicating switch from above.
Figure 6:
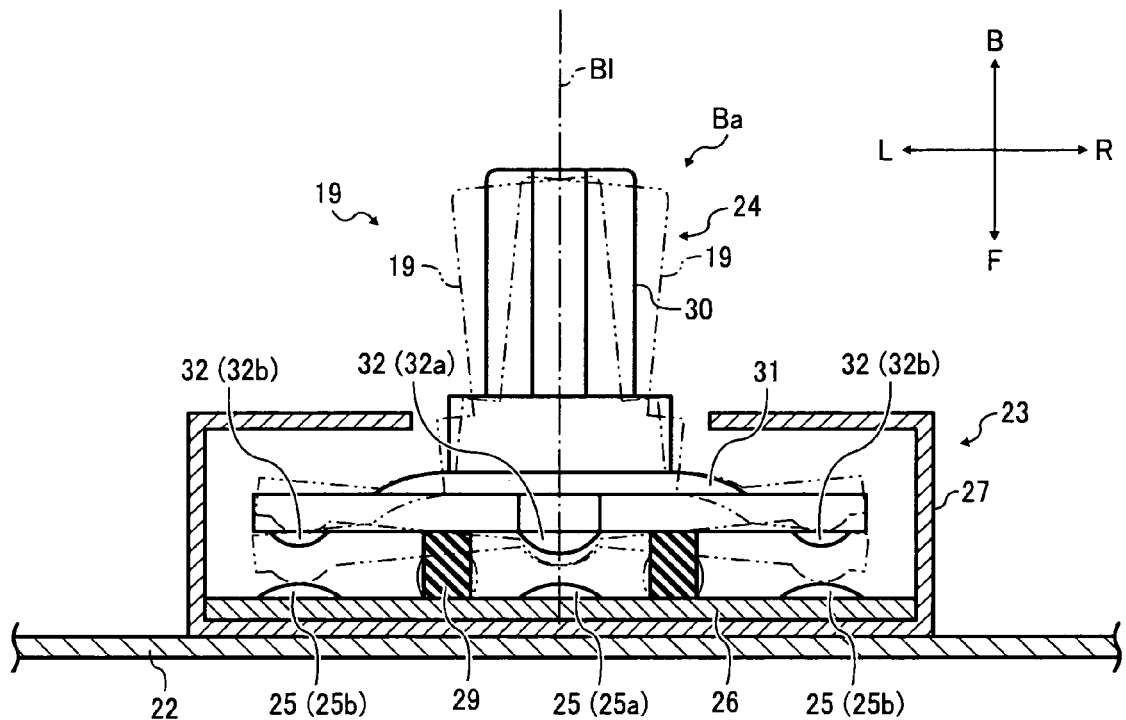
FIG. 6 is a partially cross-sectional explanatory view obtained along a line I-I of FIG. 5 describing a movement of the switching device.
Figure 7:
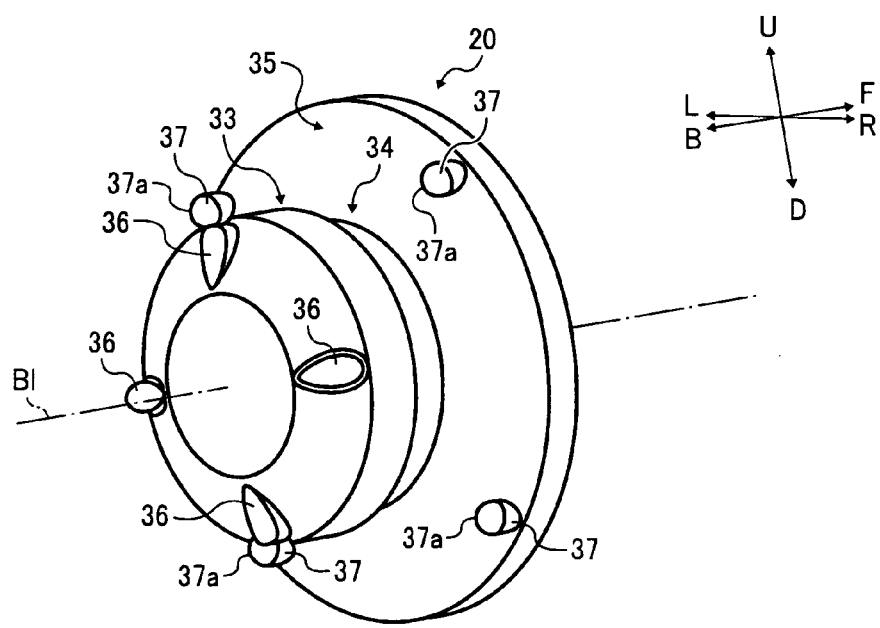
FIG. 7 is a schematic perspective view of an operating cap.
Figure 8:
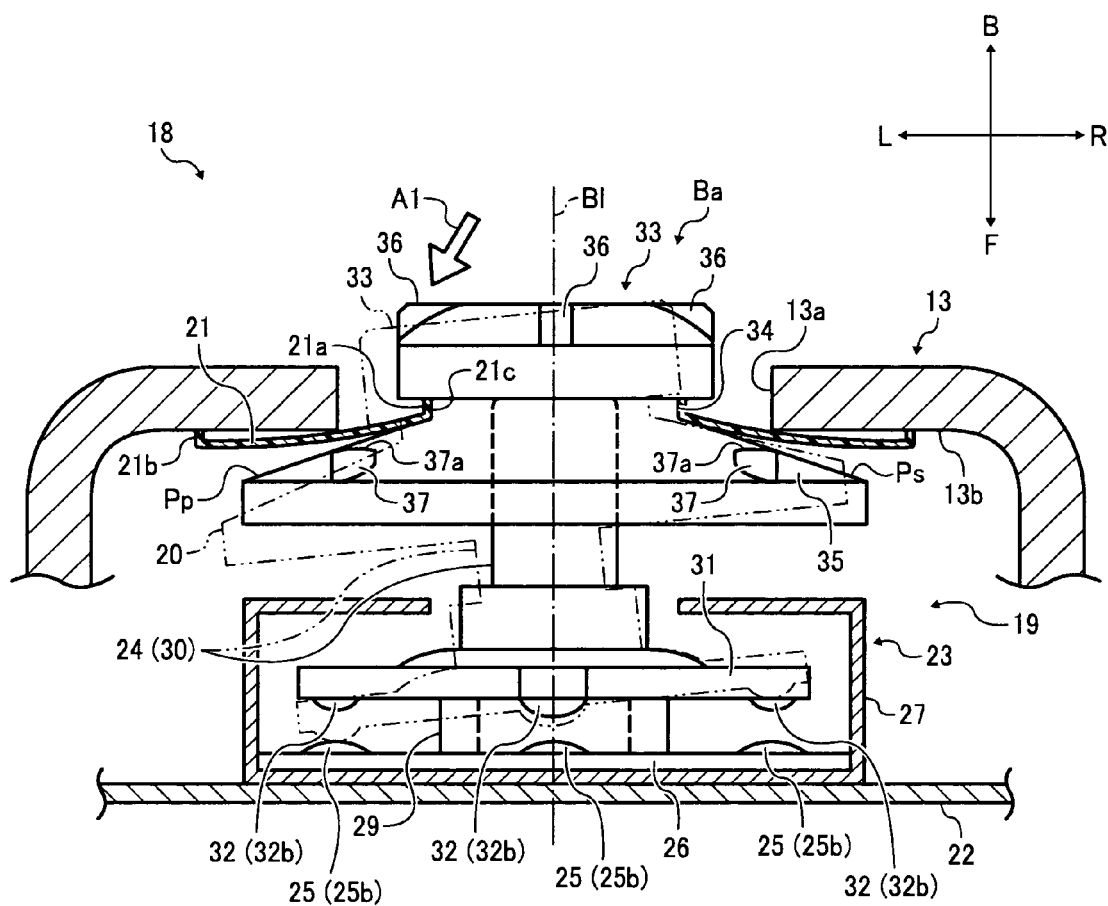
FIG. 8 is a partially cross-sectional explanatory view obtained along a line II-II of FIG. 4 describing a movement of the direction indicating switch.
Figure 9:
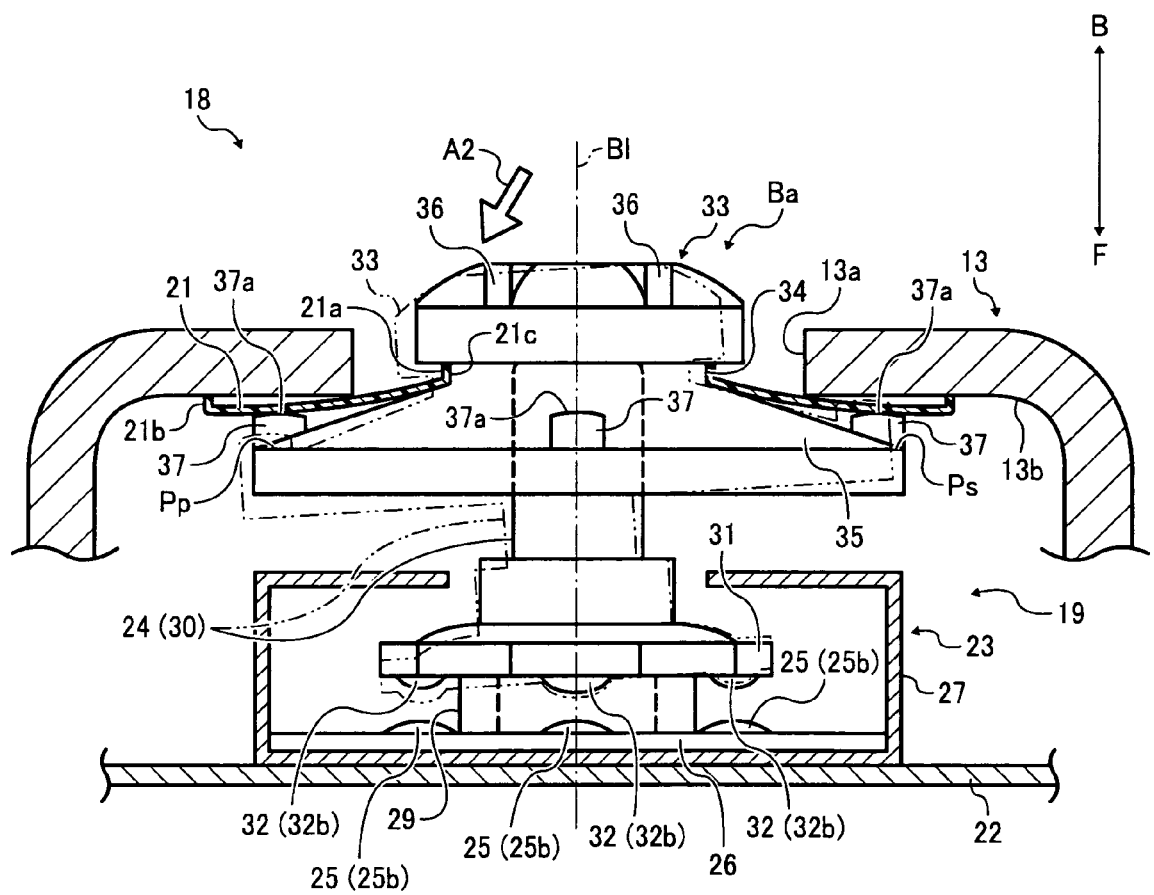
FIG. 9 is an explanatory view obtained along a line III-III of FIG. 4, which is the same as FIG. 8.

FIG. 3 is an exploded schematic perspective view describing a peripheral structure of the direction indicating switch 18. FIG. 4 is a top view of the direction indicating switch 18 from above (back when the direction indicating switch 18 is attached to the camera 10). FIG. 5 is a top view of a switching device 19 of the direction indicating switch 18 from above. FIG. 6 is a partially cross-sectional explanatory view obtained along a line I-I of FIG. 5 describing a movement of the switching device 19. FIG. 7 is a schematic perspective view of an operating cap 20. In addition, FIG. 8 is a partially cross-sectional explanatory view obtained along a line II-II of FIG. 4 describing a movement of the direction indicating switch 18, and FIG. 9 is an explanatory view obtained along a line III-III of FIG. 4, which is the same as FIG. 8. In FIG. 4, a sealing member 21, which is described later, is not illustrated in order to understand easily.

The direction indicating switch 18, as described in FIG. 3, has the switching device 19, the operating cap 20 and the sealing member 21. The direction indicating switch 18 is installed on a controlling base board 22 stored in the case 11, and a part of the operating cap 20 is exposed from a switch opening 13*a* formed on the back case 13 as an opening part (See FIG. 1).

The switching device 19 is an electric element to specify an arbitrary indicating direction, as described in FIGS. 5 and 6, and has a switch base 23 and an operating section 24. The switch base 23 is mainly structured such that a base board for a switch 26, on which five contact points on a side of the base 25 are provided, is stored in a switch case 27. The switch case 27 is fixed on the controlling base board 22 by a leg part for installation 28 provided therewith, and the base board for the switch 26 and the controlling board 22 are electrically connected via the leg part for installation 28. And thereby, the switching device 19 is mounted on the controlling base board 22.

The five contact points on the side of the base 25 include, on the base board for the switch 26, a central contact point on the side of the base 25*a*, which is centrally placed, and four contact points for indicating on the side of the base 25*b*, centering on the central contact point on the side of the base 25*a*, which are respectively placed in up, down, right and left directions at equal intervals. Therefore, as for the five contact points on the side of the base 25, on the base board for the switch 26, in a state of being attached to the camera 10, three of the five contact points on the side of the base 25 are placed in parallel in the up-and-down direction UD at equal intervals, and one of the three of the five contact points on the side of the base 25 is placed in their center and another two of the five contact points on the base side 25 are placed in parallel in the right-and-left direction LR at equal intervals, so that the five contact points on the side of the base 25 are set to be placed in a cross shape. On the base board for the switch 26 on which the five contact points on the side of the base 25 are provided, an annular rubber 29 (illustrated in a cross section in FIG. 6) is provided to encircle the central contact point on the side of the base 25*a*, and the operating section 24 is placed on the annular rubber 29.

The operating section 24 has a stick part for operation 30 which is pillar-shaped, and a flat plate part for intermittence 31. The flat plate part for intermittence 31 is continuously provided on a lower side of the stick part for operation 30 (in front, in a state of being attached to the camera 10). Five contact points on a side of the operating section 32 are provided on a lower surface of the flat plate part for intermittence 31 (a surface placed in front, in the state of being attached to the camera 10). The five contact points on the side of the operating section 32 have a central contact point on the side of the operating section 32*a* and four contact points for indicating on the side of the operating section 32*b*. The central contact point on the side of the operating section 32*a* is placed on an axis of the stick part for operation 30, and the four contact points for indicating on the side of the operating section 32*b*, centering on the central contact point on the side of the operating section 32*a*, are set to be placed in a cross shape to face each of the four contact points for indicating on the side of the base 25*b*. The operating section 24 is supported by the annular rubber 29, so that the axis of the stick part for operation 30 is orthogonal to the base board for the switch 26, and in this case, a position where the axis exists is taken as a reference line B1. In a state where the axis of the stick part for operation 30 corresponding to the reference line B1 is a reference position Ba, and the annular rubber 29 is elastically deformed so as to be squashed partially, and thereby it is possible for the operating section 24 to be tilted in a radial direction from the reference position Ba. In addition, in the embodiment 1, the four contact points for indicating on the side of the operating section 32*b* are set to be projected equally to each other, and the central contact point on the side of the operating section 32*a* is set to be projected more than the four contact points for indicating on the side of the operating section 32*b*. And thereby, when the operating section 24 is pressed down along the reference line B1, each of the four contact points for indicating on the side of the operating section 32*b* does not abut on each of the four contact points for indicating on the side of the base 25*b*, and the central contact point on the side of the operating section 32*a* abuts on the central contact point on the side of the base 25*a*.

In the switching device 19, as illustrated by a two-dot chain line in FIG. 6, when the operating section 24 is tilted from the reference position Ba (the axis of the stick part for operation 30 is inclined with respect to the reference line B1), and when a contact point for indicating on the side of operating section 32b in an orbit position abuts on a contact point for indicating on the side of the operating section 25b facing the contact point for indicating on the side of the operating section 32b, a contact point of the contact point for indicating on the side of the operating section 32b and the contact point for indicating side of the base 25b is in a conductive state. In addition, in the switching device 19, when the operating section 24 is pressed down along the reference line B1 (pressed forward, in the state of being attached to the camera 10 (See FIG. 1)) and the central contact point on the side of the operating section 32a facing the central contact point on the side of the base 25a abuts on the central contact point on the side of the base 25a, a contact point between the central contact point on the side of the operating section 32a and the central contact point on the side of the base 25a is in the conductive state, and which is not illustrated in a drawing. If any one of the contact points is in the conductive state as described above, the conductive state is transmitted to the controlling base board 22 as an electric signal via the base board for the switch 26 and the leg part for installation 28. And thereby, it is possible for the switching device 19 to specify an arbitrary indicating direction corresponding to a tilt operation performed by the operating section 24, and also to specify an indication other than specified directions by a press-down operation performed by the operating section 24. Thus, in the switching device 19, in a case where the stick part for operation 30 of the operating section 24 is tilted to four directions such as up, down, right and left directions (predetermined indicating directions) viewed from the reference line B1, when contact points for indicating on the side of the operating section 32b placed in each direction abut on contact points for indicating on the side of the base 25b facing the contact points for indicating on the side of the operating section 32b, a contact point between the contact points for indicating on the side of the operating section 32b and the contact points for indicating on the side of the base 25b is in a conductive state. Therefore, in this abutted state, the operating section 24 is tilted over a predetermined angle. The operating cap 20 is attached to the stick part for operation 30 of the operating section 24 (See FIG. 3). Therefore, the switch base 23 is a switch section which switches a conduction of the contact points by a tilt of the operating section 24.

The operating cap 20, as illustrated in FIG. 7, has a head part for operation 33, a neck part 34 and a flange part 35. The head part for operation 33 is approximately cylinder-shaped. The flange part 35 is continuously provided at the bottom (front in the state of being attached to the camera 10) of the operating cap 20 via the neck part 34. Four indicating parts 36 are provided on a surface of the head part for operation 33 (a surface which is exposed from the case 11 and placed in a back side in the state of being attached to the camera 10), and it is possible for the head part for operation 33 to accept the stick part for operation 30 so as to correspond to an axis of the head part for operation 33 and an axis of the stick part for operation 30 on a reverse side of the head part for operation 33 (See FIGS. 8 and 9).

The four indicating parts 36 are formed such that a peripheral edge part of a round surface of the head part for operation 33 is partially projected, and have equal intervals to each other in an orbit direction (See FIG. 4). The four indicating parts 36, as illustrated in FIG. 4, are provided corresponding to four contact points on the side of the operating section 32 in orbit positions and four contact points on the side of the base 25 facing the four contact points on the side of the operating section 32. In a state where the operating cap is attached properly to the stick part for operation 30 of the operating section 24 of the switching device 19, a direction of a proper tilt operation of the operating section 24 of the switching device 19 is indicated on the operating cap 20. On the lower side of the head part for operation 33, as illustrated in FIGS. 7, 8 and 9, the neck part 34 is provided as an annular recess, and the flange part 35 is provided continuously with the neck part 34.

The flange part 35 has a truncated cone shape, which spreads from the neck part 34 to a bottom (front in the state of being attached to the camera 10), and four projected parts 37 are provided on an inclined surface of the flange part 35. Each of the four projected parts 37 has a cylinder shape having an axis parallel to the axis of the head part for operation 33, and has projected ends 37a in which corners are entirely cut away. In addition, the four projected parts 37, from above (back in the state of being attached to the camera 10), as illustrated in FIG. 4, are placed on a peripheral edge part of the inclined surface which is round, and have equal intervals to each other in the orbit direction. The four projected parts 37 are set to be placed in middle positions of each of the four contact points for indicating on the side of the operating section 32b and each of the four contact points for indicating on the side of the base 25b facing the four contact points for indicating on the side of the operating section 32b, viewed in the orbit direction centering on the reference line B1 on a flat surface orthogonal to the reference line B1, when the operating cap 20 is attached properly to the stick part for operation 30 of the operating section 24 of the switching device 19. That is, in the state of being attached to the camera 10, viewed on the flat surface orthogonal to the reference line B1, the four contact points for indicating on the side of the operating section 32b (the same as the four contact points for indicating on the side of the base 25b) are placed on straight lines passing on the reference line B1 and having 45-degree angles to the up-and-down direction UD and to the right-and-left direction LR. In addition, a height of the four projected parts 37 from a surface of the flange part 35 is set to fulfill a predetermined condition. The predetermined condition will be described later. The sealing member 21 is attached to this operating cap 20 (See FIG. 3).

The sealing member 21, as illustrated in FIGS. 3 and 4, is an annular thin film and is formed by an elastic-deformable material. For example, in the present embodiment, the sealing member 21 is formed by a rubber material. The sealing member 21, as illustrated in FIGS. 8 and 9, has an inner rib part 21a and an outer rib part 21b. The inner rib part 21a is capable of abutting on through a whole circumference of the neck part 34 of the operating cap 20. The outer rib part 21b extends from inside (inside of the case 11) to the back case 13 in an outward position of the flange part 35 of the operating cap 20. The sealing member 21 pushes and extends out an inner opening part 21c determined by the inner rib part 21a, then inserts the head part for operation 33 of the operating cap 20 into the inner opening part 21c, and is attached on the operating cap 20. The operating cap 20 on which the sealing member is attached is attached to the stick part for operation 30 of the operating section 24 of the switching device 19 fixed on the controlling base board 22. If the controlling base board 22 is stored in the case 11 properly, as illustrated in FIGS. 1, 8 and 9, the head part for operation 33 of the operating cap 20 is exposed outward from a switch opening hole 13a of the back case 13. In addition, in this state, the inner rib part 21a of the sealing member 21 encircles and abuts on the neck part 34 of the operating cap 20, and the outer rib part 21b of the sealing member 21 abuts on a peripheral wall (surface) part which determines the switch opening hole 13a of the back case 13 from inside (inside of the case 11), and thereby it is possible to prevent dust and the like from entering the case 11 from the switch opening hole 13a. The sealing member 21 blocks a gap between the switch opening hole 13a and the operating cap 20, and also has a role of avoiding exposing the inside of the case 11 from the outside.

In the direction indicating switch 18, as illustrated in FIGS. 8 and 9, when a neighborhood of a peripheral edge part of the head part for operation 33 of the operating cap 20 (including the indicating part 36) is pressed against a biasing force of the annular rubber 29 (See an arrow A1 in FIGS. 4 and 8, and an arrow A2 in FIGS. 4 and 9), the stick part for operation 30 of the operating section 24 of the switching device 19 tilts toward a direction of a pressed spot viewed from the reference line B1 (See arrows A1 and A2 in FIG. 4) from the reference position Ba (See the operating section 24 illustrated by a two-dot chain line in FIGS. 8 and 9). Then, the operating cap 20 is moved rotationally centering around a tilt axis of the stick part for operation 30 in the switching device 19, and in the flange part 35 of the operating cap 20, a spot Pp (hereinafter, a spot in a pressed direction Pp) on a side of a pressed direction viewed from the reference line B1 is spaced from the back case 13, and on the other hand, a spot Ps (hereinafter, a spot in a point symmetry direction Ps), which is point-symmetric to the spot Pp in the pressed direction centering on the reference line B1, approaches the back case 13. Taking the above into account, the flange part 35 of the operating cap 20 has a folding-fan shape (a truncated cone shape), so that the spot in the point symmetry direction which is point-symmetric centering on the pressed direction and the reference line B1, when the operating section 24 is tilted, does not interfere in the back case 13.

Here, in a case where a pressed position, as illustrated by an arrow A1 in FIGS. 4 and 8, is the indicating part 36 of the head part for operation 33 of the operating cap 20, the stick part for operation 30 of the operating section 24 of the switching device 19 is tilted over a predetermined angle in a predetermined indicating direction A1 from the reference position Ba, and the contact point for indicating on the side of the operating section 32b placed in the indicating direction A1 viewed from the reference line B1, abuts on the contact point for indicating on the side of the base 25b and are in the conductive state to each other (See the operating section 24 illustrated by a two-dot chain line in FIG. 8).

In addition, in a case where the pressed position, as illustrated by an arrow A2 in FIGS. 4 and 9, is a spot which is not the indicating part 36 of the head part for operation 33 of the operating cap 20 (in an illustrated example, a middle position of two indicating parts 36 which are adjacent to each other), the stick part for operation 30 of the operating section 24 of the switching device 19 is tilted in a direction A2, which is different from the predetermined indicating direction, from the reference position Ba. In this case, on the flange part 35 of the operating cap 20, the projected part 37 is provided in the spot in the point symmetry direction Ps, which is point-symmetric to the direction A2. The projected end 37a of the projected part 37 abuts on an inner wall surface 13b (a peripheral wall part which determines the switch opening hole 13a) of the back case 13, with the sealing member 21 in between. And thereby, it is possible to prevent the stick part for operation 30 (the operating section 24) from tilting to the predetermined angle (to the reference line B1), where two contact points for indicating on the side of the operating section 32b placed to have the direction A2 in between abut on contact points for indicating on the side of the base 25b respectively facing the two contact points for indicating on the side of the operating section 32b (See the operating section 24 illustrated by two-dot line in FIG. 9). Therefore, in the embodiment 1, the flange part 35 and the inner wall surface 13b function as a tilt controlling section (a tilt controlling means), the flange part 35 of the operating cap 20 functions as a plate member, and the inner wall surface 13b of the back case 13 functions as an abutted surface part. In other words, in a case where the stick part for operation 30 of the operating section 24 of the switching device 19 is tilted in the predetermined indicating direction (See an arrow A1 in FIGS. 4 and 8), the four projected parts 37 are set not to interfere in the inner wall surface 13b of the back case 13 in a position which is displaced by 45 degrees in the orbit direction from the spot in the point symmetry direction to the indicating direction in the flange part 35, and in a case where the stick part for operation 30 of the operating section 24 of the switching device 19 is tilted in the direction different from the predetermined indicating direction (See an arrow A2 in FIGS. 4 and 9), the four projected parts 37 are set to have the height to interfere in the inner wall surface 13b of the back case 13 in the spot in the point symmetry direction to the indicating direction in the flange part 35. Additionally, in a case where the stick part for operation 30 of the operating section 24 of the switching device 19 is tilted, the sealing member 21, particularly, the outer rib part 21b is set to have a thickness (hardness) so as not to disturb the tilt operation.

Therefore, as for the direction indicating switch 18, in a case where the tilt operation is performed in the direction different from the predetermined indicating direction (see FIG. 9), compared to a case where the tilt operation is performed in the predetermined direction (see FIG. 8), when the reference line B1 (the reference position Ba) is taken as a reference, a tilt of the stick part for operation 30 is prevented at a small angle, and no contact points are in the conductive state and also no directions are specified. If someone who operates the direction indicating switch 18, that is, a user of the camera 10, attempts to perform the tilt operation in the direction different from a proper indicating direction, the operating section 24 is prevented from tilting as a case in the proper indicating direction. Therefore, there is no possibility that the indicating direction against a user's intention is specified, the indicating direction is not specified though the operating section 24 is tilted to an angle which is equal to the case where the tilt operation is performed in the predetermined indicating direction, and the user feels a sense of incongruity.

Accordingly, as for the direction indicating switch 18 according to the embodiment 1 of the present invention, if the operating section 24 is tilted in the direction different from the predetermined indicating direction, the operating section 24 is prevented from tilting over the predetermined angle by the tilt controlling section in the direction different from the predetermined indicating direction. It is possible to prevent the operating section from tilting in an improper direction, that is, it is possible to prevent an operational error. Therefore, it is possible to prevent the indicating direction against a user's intention from being specified, and it is possible to prevent the indicating direction from not being specified though the operating section 24 is tilted.

Moreover, as for the direction indicating switch 18, the projected part 37 provided on the flange part 35 of the operating cap 20 as the plate member abuts on the inner wall surface 13b of the back case 13 as the abutted surface part according to a tilt direction of the operating section 24, so that a tilt range of the operating section 24 is controlled. And the projected part 37 does not abut on the inner wall surface 13b of the back case 13, and this allows the operating section 24 to perform a proper tilt operation. Therefore, it is possible to prevent an operational error of the operating section 24 with a simple structure.

Additionally, as for the direction indicating switch 18, the tilt controlling section is structured such that the operating cap 20 attached to the stick part for operation 30 of the operating section 24 of the switching device 19 functions as the plate member, and the inner wall surface 13b of the back case 13 functions as the abutted surface part. Therefore, it is possible to use the switching device 19 which is generally used, and to form the direction indicating switch 18, in which the operational error of the operating section 24 is properly prevented, and also to install the direction indicating switch 18 in the camera 10.

As for the direction indicating switch 18, it is possible to recognize whether the tilt operation is performed in a proper indicating direction from the reference line B1 or not, from a tilt condition of the operating section 24, that is, from the tilt condition of the operating cap 20, in other words, from a sense of the tilt operation when the tilt operation is performed. As for the camera 10 in which the direction indicating switch 18 is installed, it is possible to perform a proper tilt operation with the sense of the tilt operation and to properly choose a desired function from various functions. This, in particular, in a situation that a user operates the direction indicating switch 18 looking in the optical finder 16, is effective and makes it possible for the user to effectively use a function of the optical finder 18, since there is no need to take the user's eyes off the optical finder 16 in order to operate the direction indicating switch 18.

As for the direction indicating switch 18, on the flange part 35 of the operating cap 20 viewed in the orbit direction, the projected parts 37 provided in middle positions of the predetermined directions (up, down, right and left directions in the embodiments described above) are structured to abut on the inner wall surface 13b of the back case 13. And thereby, in a situation that a spot which is not the indicating part 36 is pressed, except for a case where a middle position between indicating parts 36 viewed in the orbit direction on the head part for operation 33 of the operating cap 20 is pressed when the tilt operation is performed, an abutted spot of the projected part 37 and the back case 13 is taken as a fulcrum, and it is possible for a tilt direction of the operating cap 20, that is, the operating section 24 to lead to a direction so as to press down the closest indicating part 36 (the predetermined indicating direction from the reference line B1) from a pressed position (the tilt direction viewed from the reference line B1). In particular, in the embodiment described above, each of the projected ends 37a of the projected part 37 has cut away corners and has a curved surface, and this allows the tilt direction of the operating section 24 to lead effectively to the predetermined directions (up, down, right and left). Therefore, as for the camera 10 in which the direction indicating switch 18 is installed, it is possible for users to perform a proper tilt operation without looking at the direction indicating switch 18 and to choose properly a desired function from various functions.

Therefore, as for the camera 10 according to the embodiment 1 of the present invention, it is possible to prevent the operating section 24 of the direction indicating switch 18 from tilting in an improper direction, that is, it is possible to prevent an operational error.

Figure 10:
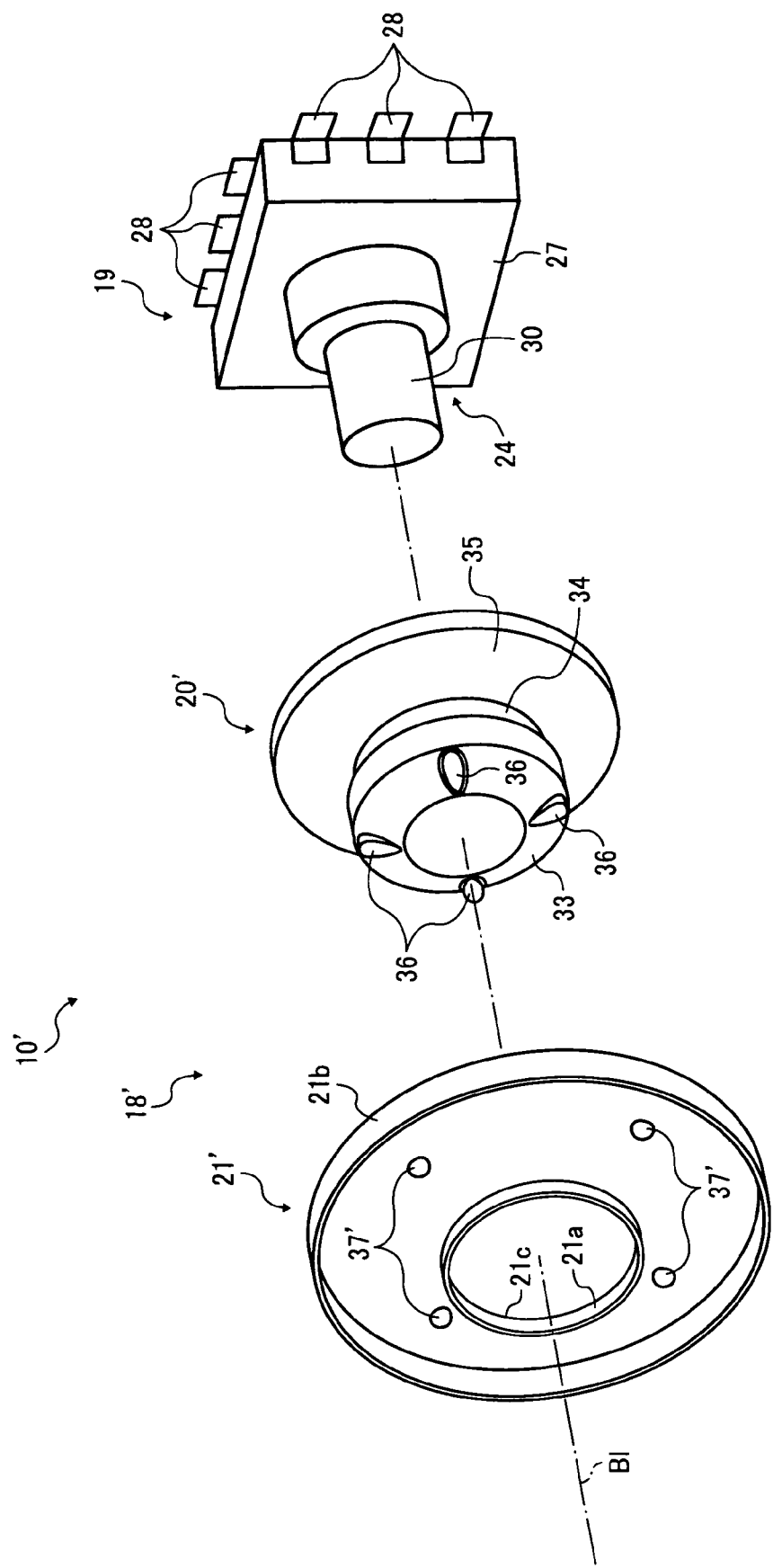
FIG. 10 is an exploded schematic perspective view explaining a peripheral structure of a first variant example of the direction indicating switch.

Next, a first variant example of the embodiment 1 will be explained. A characteristic of the first variant example is to provide a projected part 37' on a sealing member 21', as illustrated in FIGS. 10 and 11, instead of providing the projected part 37 on the flange part 35 of the operating cap 20.

A direction indicating switch 18' according to the first variant example is structured such that the sealing member 21' on which the projected part 37' is provided, is attached to an operating cap 20' on which a projected part is not provided. The projected part 37' is formed integrally with the sealing member 21', and is also formed by a same elastic-deformable material which forms the sealing member 21'. Except for the above, the projected part 37' has a same structure as the projected part 37 which is provided on the flange part 35 of the operating cap 20 of the direction indicating switch 18.

Figure 11:
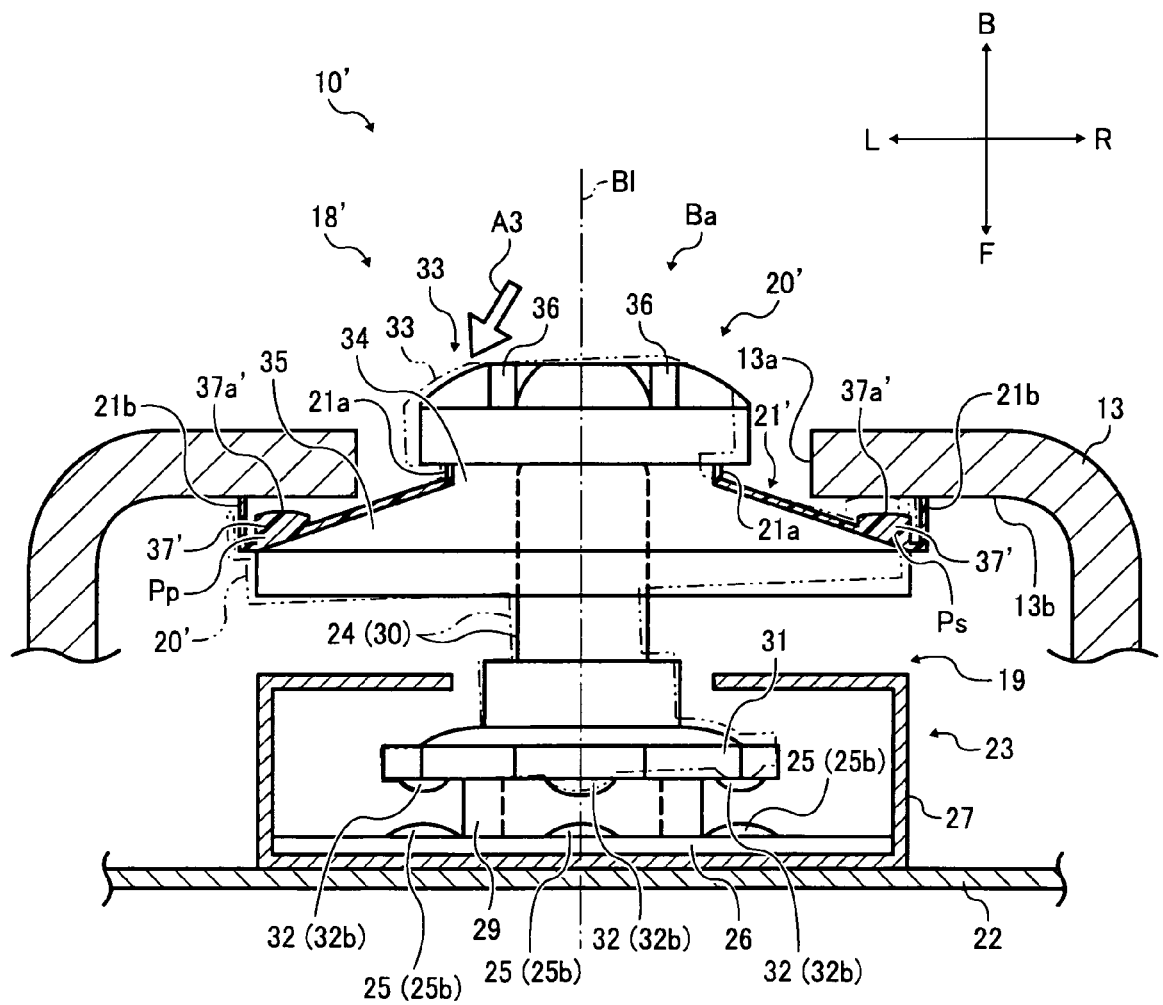
FIG. 11 is an explanatory view of the first variant example of the movement of the direction indicating switch, which is the same as FIG. 9.

As for the direction indicating switch 18', as illustrated by an arrow A3 in FIG. 11, in a case where a spot which is not the indicating part 26 of the head part for operation 33 of the operating cap 20 is pressed (in an illustrated example, a middle position between two indicating parts 36 which are adjacent to each other), the stick part for operation 30 of the operating section 24 of the switching device 19 is tilted in an indicating direction A3, which is different from the predetermined indicating direction, from the reference position Ba. On a sealing member 21' provided on the operating cap 20', a projected end 37a' of the projected part 37' provided in the spot in the point symmetry direction Ps, which is point-symmetric to the indicating direction A3, abuts on the back case 13, and thereby it is possible to prevent the stick part for operation 30 (the operating section 24) from tilting to an angle (to the reference line B1) where two contact points for indicating on the side of the operating section 32b placed to have the indicating direction A3 in between abut on contact points for indicating on the side of the base 25b respectively facing the two contact points for indicating on the side of the operating section 32b (See the operating section 24 illustrated by a two-dot chain line). Therefore, as for the direction indicating switch 18' as well as the direction indicating switch 18, in a case where a tilt operation is performed in a direction which is different from the predetermined indicating direction, comparing with a case where the tilt operation is performed in the predetermined indicating direction, and the reference line B1 is taken as a reference, a tilt of the stick part for operation 30 (the operating section 24) is prevented at a small angle and no directions are specified.

In particular, as for the first variant example of the direction indicating switch 18', in a case where a tilt operation is performed in a direction different from the predetermined direction viewed from the reference line B1 (the reference position Ba), if the projected part 37' abuts on the back case 13, the tilt of the stick part for operation 30 of the operating section 24 of the switching device 19 does not stop immediately but as an angle of the tilt from the reference line B1 becomes larger, and a reaction force in regard to the tilt operation becomes larger gradually, because the projected part 37' which abuts on the back case 13 is an elastic-deformable material. Therefore, when a user of the camera 10' performs the tilt operation of the direction indicating switch 18', it is possible for the user to recognize if a direction of the tilt operation is appropriate or not by a difference of the reaction force. And thereby, a feeling of the tilt operation of the direction indicating switch 18', that is, a feeling of an operation of the camera 10' can be recognized more clearly.

Figure 12:
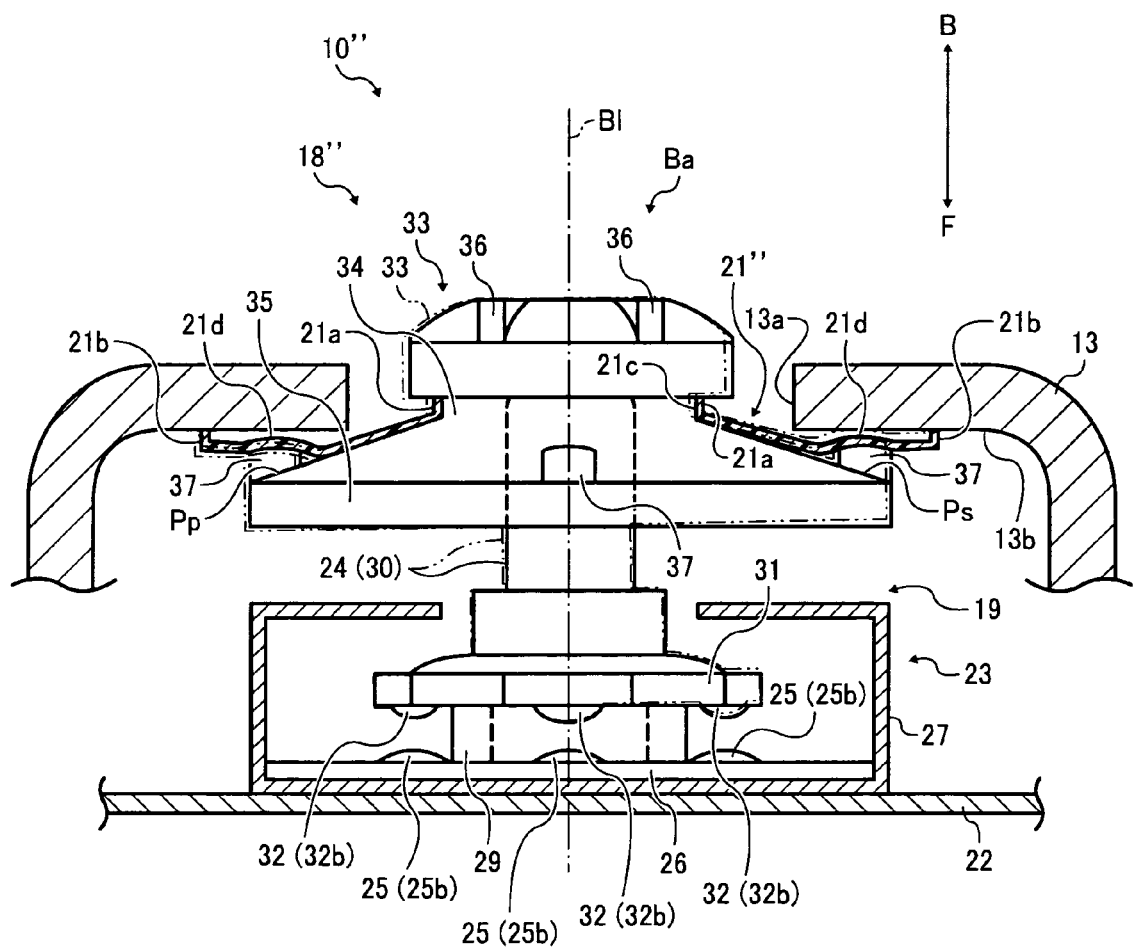
FIG. 12 is an explanatory view of a second variant example describing a movement of the direction indicating switch, which is the same as FIG. 9.

Next, a second variant example of the embodiment 1 will be explained. A characteristic of the second variant example is that, as illustrated in FIG. 12, a curved part 21d capable of accepting the projected part 37 from a reverse side is provided with a sealing member 21" attached to the operating cap 20, in which the projected part 37 is provided on the flange part 35.

As for a direction indicating switch 18" according to the second variant example, the sealing member 21" is structured to be installed in the operating cap 20, so that the projected part 37 of the flange part 35 of the operating cap 20 can fit in the curved part 21d.

It is possible for the direction indicating switch 18', that is, a camera 10", to obtain a same effect as the direction indicating switch 18 and the direction indicating switch 18'.

In particular, it is possible for the direction indicating switch 18" to prevent a relative displacement of the operating cap 20 and the sealing member 21" and to control properly a tilt range of the operating section 24 by pressing the projected part 37 of the flange part 35 of the operating cap 20 to the inner wall surface 13b of the back case 13 with the sealing member 21" in between (see the operating section 24 illustrated by a two-dot line).

Embodiment 2

Figure 13:
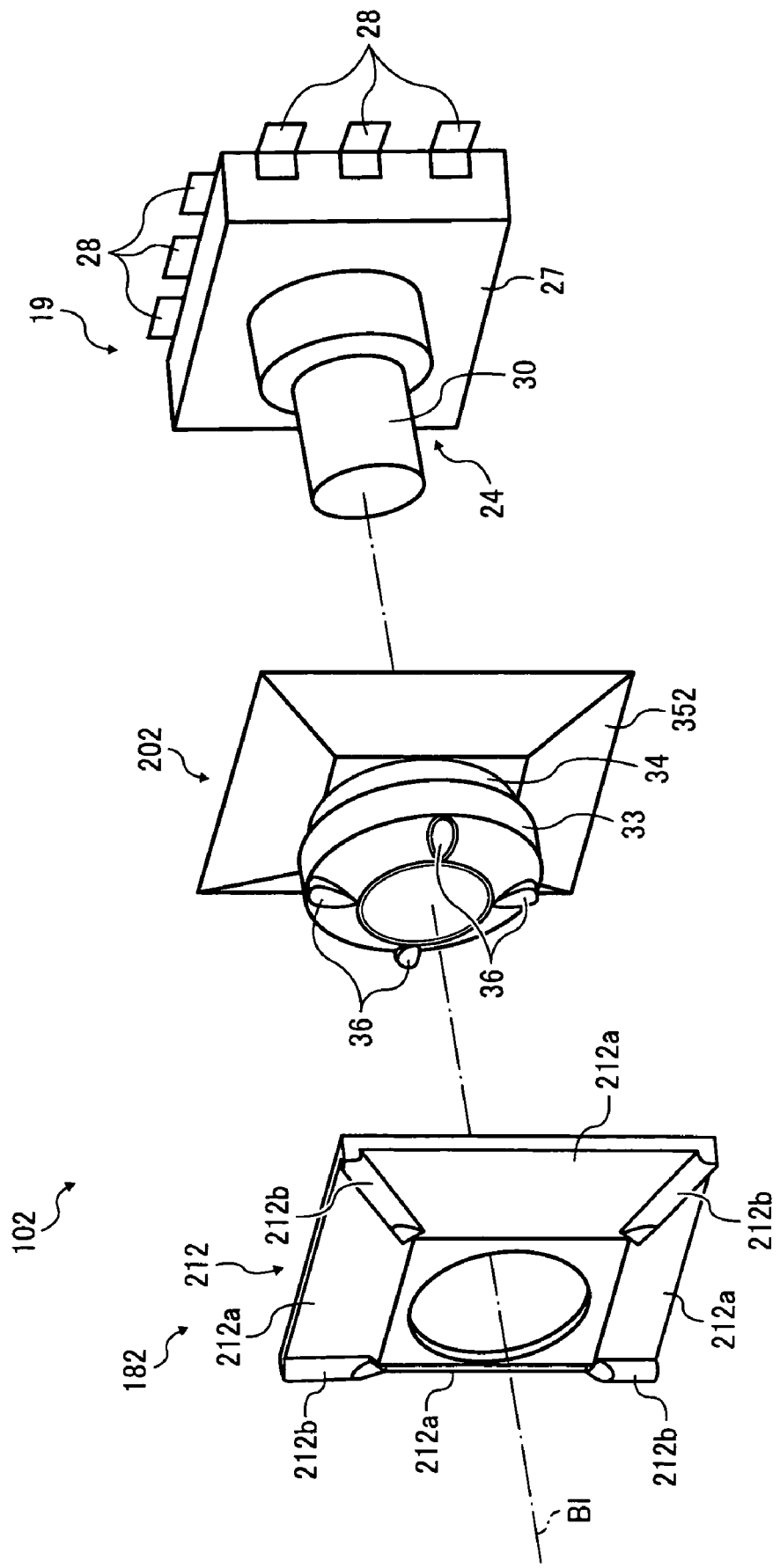
FIG. 13 is an exploded schematic perspective view describing a structure of the direction indicating switch according to an embodiment 2 of the present invention, which is the same as FIG. 10.
Figure 14:
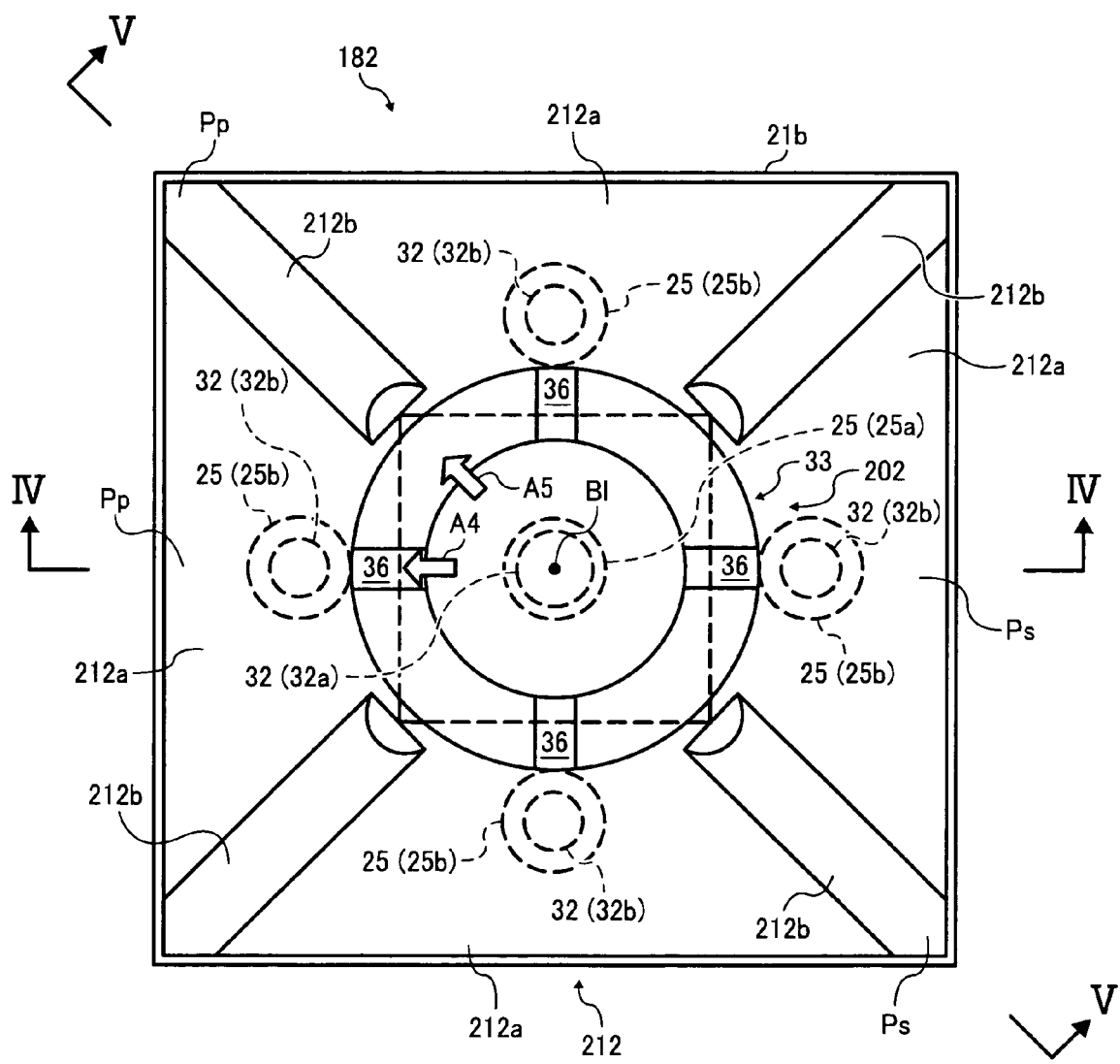
FIG. 14 is a schematic top view of the direction indicating switch according to the embodiment 2 of the present invention, which is the same as FIG. 4.
Figure 15:
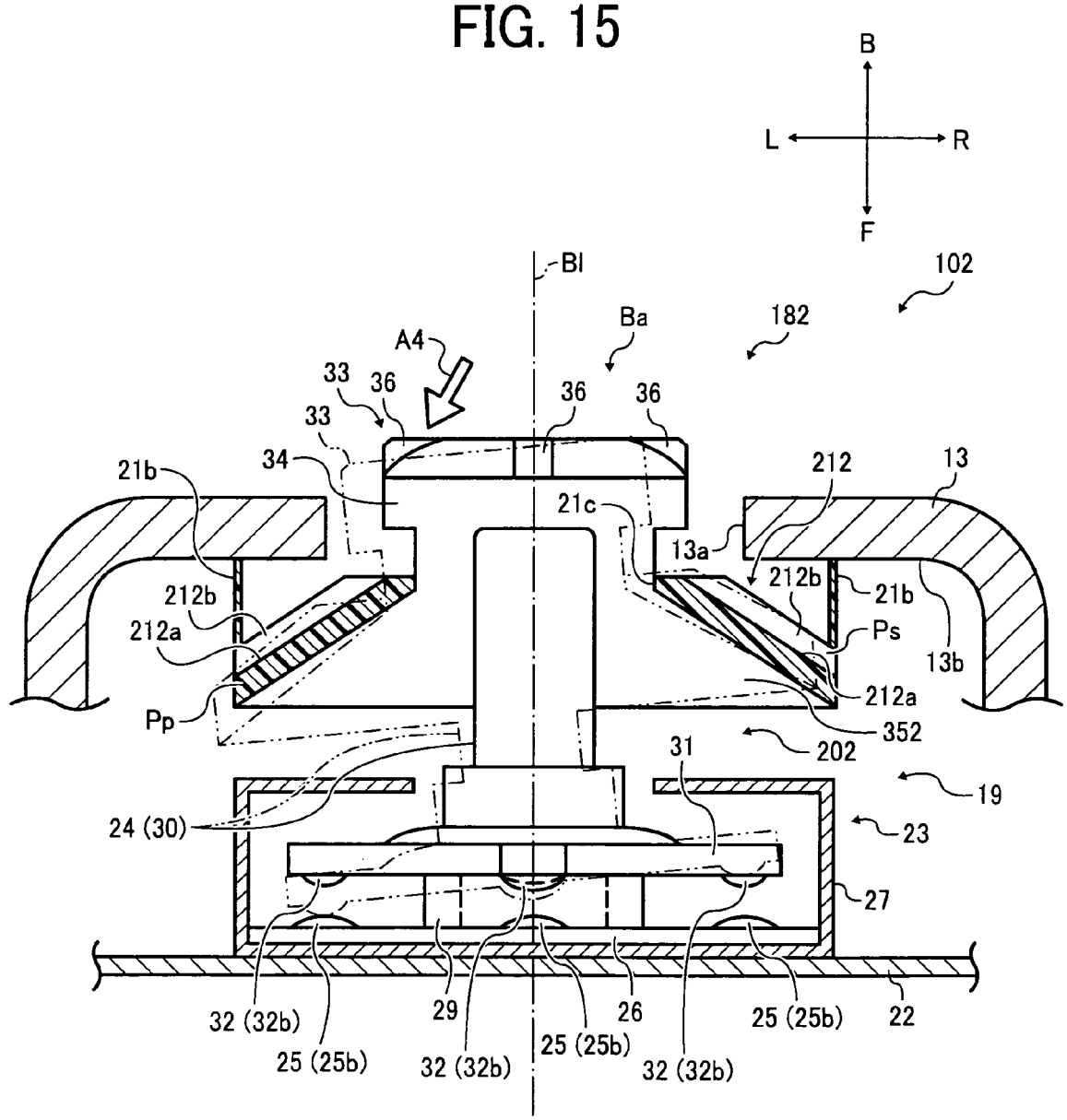
FIG. 15 is an explanatory view obtained along a line IV-IV of FIG. 14, which is the same as FIG. 8.
Figure 16:
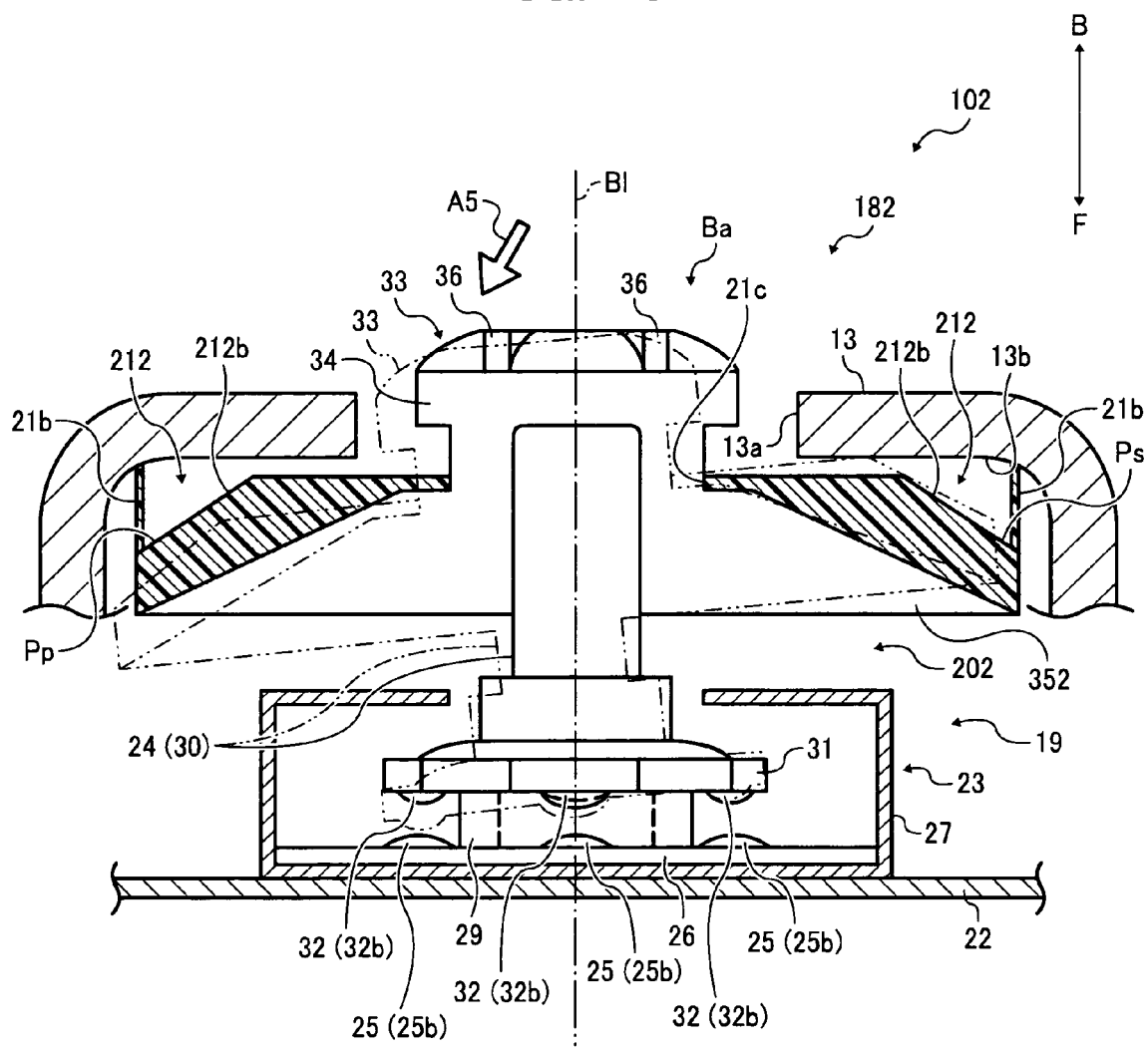
FIG. 16 is an explanatory view obtained along a line V-V of FIG. 14, which is the same as FIG. 9.

Next, a camera 102 according to an embodiment 2 of the present invention will be explained. A direction indicating switch 182 installed in the camera 102 of the embodiment 2 is an example which has a different structure from the direction indicating switch 18 of the camera 10 according to the embodiment 1. A basic structure of the camera 102 is the same as the camera 10 of the embodiment 1, therefore the same numerals denote the same functional parts of the embodiment 1 and detailed explanations will not be explained. FIG. 13 is an exploded schematic perspective view explaining a structure of the direction indicating switch 182, which is the same as FIG. 10. FIG. 14 is a schematic top view of the direction indicating switch 182, which is the same as FIG. 4. FIG. 15 is an explanatory view obtained along a line IV-IV of FIG. 14, which is the same as FIG. 8. FIG. 16 is an explanatory view obtained along a line V-V of FIG. 14, which is the same as FIG. 9. In FIG. 13, an outer rib part 21b extended to the back case 13 on a peripheral edge part of a flange part 352 is not illustrated for an easy understanding.

An operating cap 202 and a sealing member 212 of the direction indicating switch 182 installed in the camera 102, as illustrated in FIG. 13, have a different structure from the direction indicating switch 18 according to the embodiment 1.

A flange part 352 of the operating cap 202 has a different shape from that of the operating cap 20 according to the embodiment 1. The flange part 352 has a truncated quadrangular pyramid shape in which a spot equivalent to a bottom surface (a side which is attached to the switching device 19) has a square shape.

The sealing member 212 also has a truncated quadrangular pyramid shape which fits the flange part 352, and in which projected ridge line parts 212b are provided in four ridge line parts which are formed by four inclined side surfaces 212a. The four projected ridge line parts 212b extend along two adjacent inclined side surfaces 212a in a predetermined width and in a predetermined height in regard to each of the four inclined side surfaces 212a. As for the sealing member 212, ridge line parts, that is, inclined side surfaces 212a are set to be in middle positions of four predetermined directions which are set in up, down, right and left directions (directions toward the indicating parts 36 from the reference line B1 viewed in the indicating cap 202). Therefore, in the sealing member 212, a width of a cross section along a predetermined indicating direction (See FIG. 15) and a width of a cross section along a middle direction between two adjacent predetermined indicating directions (See FIG. 16) are different.

As for the direction indicating switch 182, in a case where pressed positions of the head part for operation 33 of the operating cap 202, as illustrated by an arrow A4 in FIGS. 14 and 15, are the indicating parts 36 of the head part for operation 33 of the indicating cap 202, the stick part for operation 30 of the operating section 24 of the switching device 19 is tilted in a predetermined indicating direction A4 from the reference position Ba (See the operating section 24 illustrated by a two-dot chain line in FIG. 15), and a contact point for indicating on the side of the operating section 32b placed in the indicating direction A4 viewed from the reference line B1 abuts on a contact point for indicating on the side of the base 25b, and they are mutually in a conductive state.

As for the direction indicating switch 182, in a case where pressed positions of the head part for operation 33 of the operating cap 20, as illustrated by an arrow A5 in FIGS. 14 and 16, are not the indicating parts 36 of the head part for operation 33 of the indicating cap 20 (in an illustrated example, a middle position between two mutually adjacent indicating parts 36), the stick part for operation 30 of the operating section 24 of the switching device 19 is tilted in a direction A5 different from the predetermined indicating direction from the reference position Ba. In the sealing member 212, a projected ridge line part 212b is provided in a position in a point symmetric direction Ps, which is a point symmetry in regard to the indicating direction A5, and thereby the projected ridge line part 212b abuts on the back case 13, and the stick part for operation 30 (the operating section 24) is prevented from tilting to an angle (to the reference line B1) where two contact points for indicating on the side of the operating section 32 placed to have the indicating direction A5 in between abut on contact points for indicating on the side of the base 25b respectively facing (See the operating section 24 illustrated by a two-dot chain line in FIG. 15).

Therefore, as for the direction indicating switch 182, as well as the direction indicating switch 18, in a case where the tilt operation is performed in the direction different from the predetermined indicating direction, compared to a case where the tilt operation is performed in the predetermined direction, when the reference line B1 is taken as a reference, a tilt of the stick part for operation 30 (the operating section 24) is prevented at a small angle, and no directions are specified. And thereby, if one who operates the direction indicating switch 182, that is, a user of the camera 102, performs the tilt operation in the direction different from a proper indicating direction, there is no possibility that the indicating direction against a user's intention is specified, the indicating direction is not specified though the tilt operation is performed to an angle which is equal to a case where the tilt operation is performed in the predetermined indicating direction, and the user feels a sense of incongruity.

Thus, it is possible for the camera 102 to recognize if the tilt operation performed on the direction indicating switch 182 is that from the reference line B1 toward the proper indicating direction or not by a feeling of the tilt operation, so that a proper tilt operation is performed with the feeling of the tilt operation and a desired function of various functions is chosen properly. This, in particular, is effective for a case where a user operates the direction indicating switch 182 looking in the optical finder 16 (See FIGS. 1 and 2).

In addition, as for the direction indicating switch 182, in a case where the tilt operation is performed in the direction different from the predetermined indicating direction viewed from the reference line B1, if the projected ridge line part 212b abuts on the back case 13, a tilt of the stick part for operation 30 of the operating section 24 of the switching device 19 does not stop immediately but as a tilt angle from the reference line B1 becomes larger, and a reaction force in regard to the tilt operation becomes gradually larger, because the ridge projected line part 212b which abuts on the back case 13 is formed by an elastic-deformable material. Therefore, when a user of the camera 102 performs the tilt operation of the direction indicating switch 182, it is possible for the user to recognize if a direction of the tilt operation is appropriate or not by a difference of the reaction force. And thereby, a feeling of the tilt operation of the direction indicating switch 182, that is, a feeling of an operation of the camera 102 can be recognized more clearly.

Therefore, as for the camera 102 according to the embodiment 2 of the present invention, it is possible to prevent the operating section 24 of the direction indicating switch 182 from tilting in an improper direction, that is, it is possible to prevent an operational error.

Embodiment 3

Figure 17:
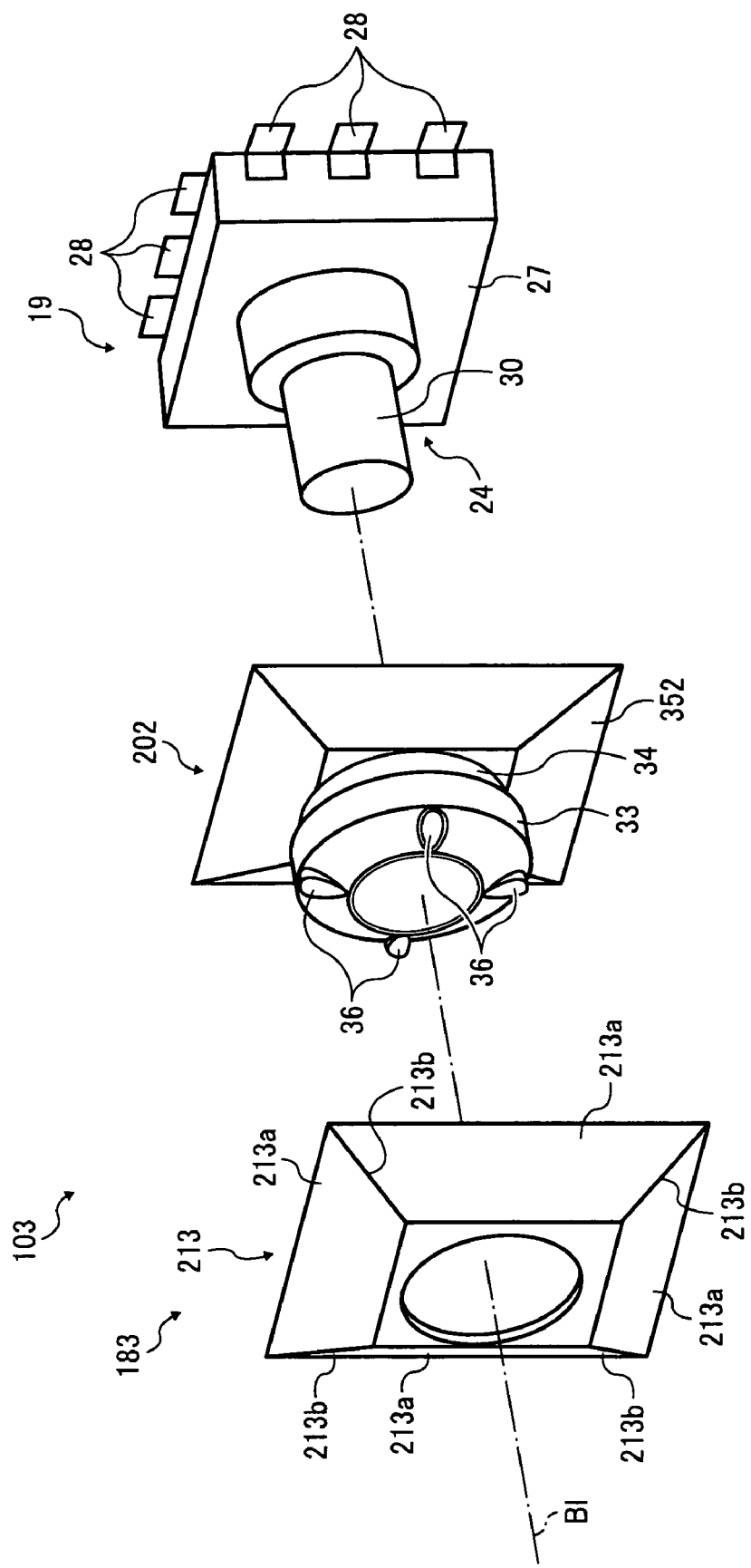
FIG. 17 is an exploded schematic perspective view of the structure of the direction indicating switch according to an embodiment 3 of the present invention, which is the same as FIG. 13.
Figure 18:
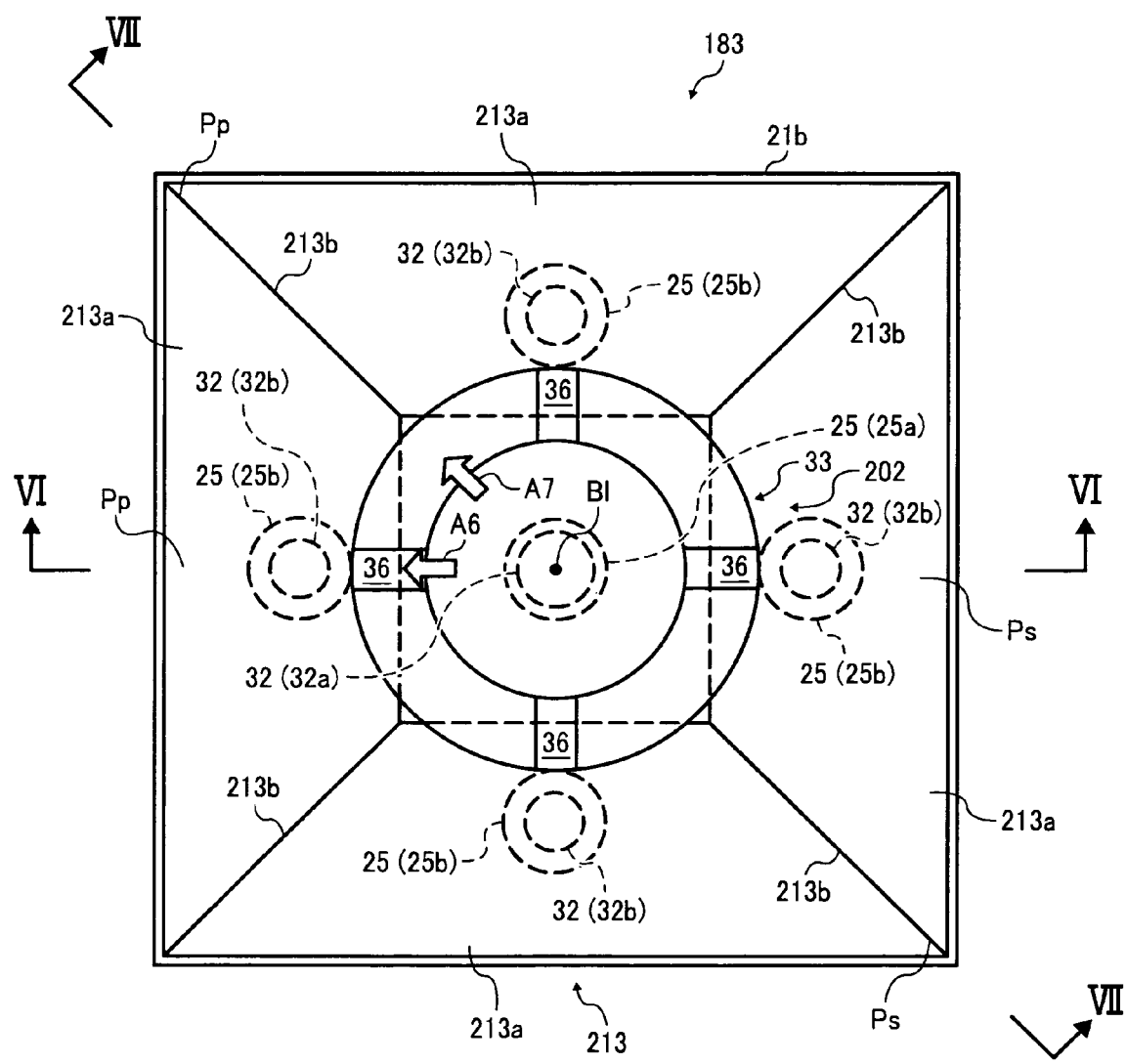
FIG. 18 is a schematic top view of the direction indicating switch according to the embodiment 3 of the present invention, which is the same as FIG. 4.
Figure 19:
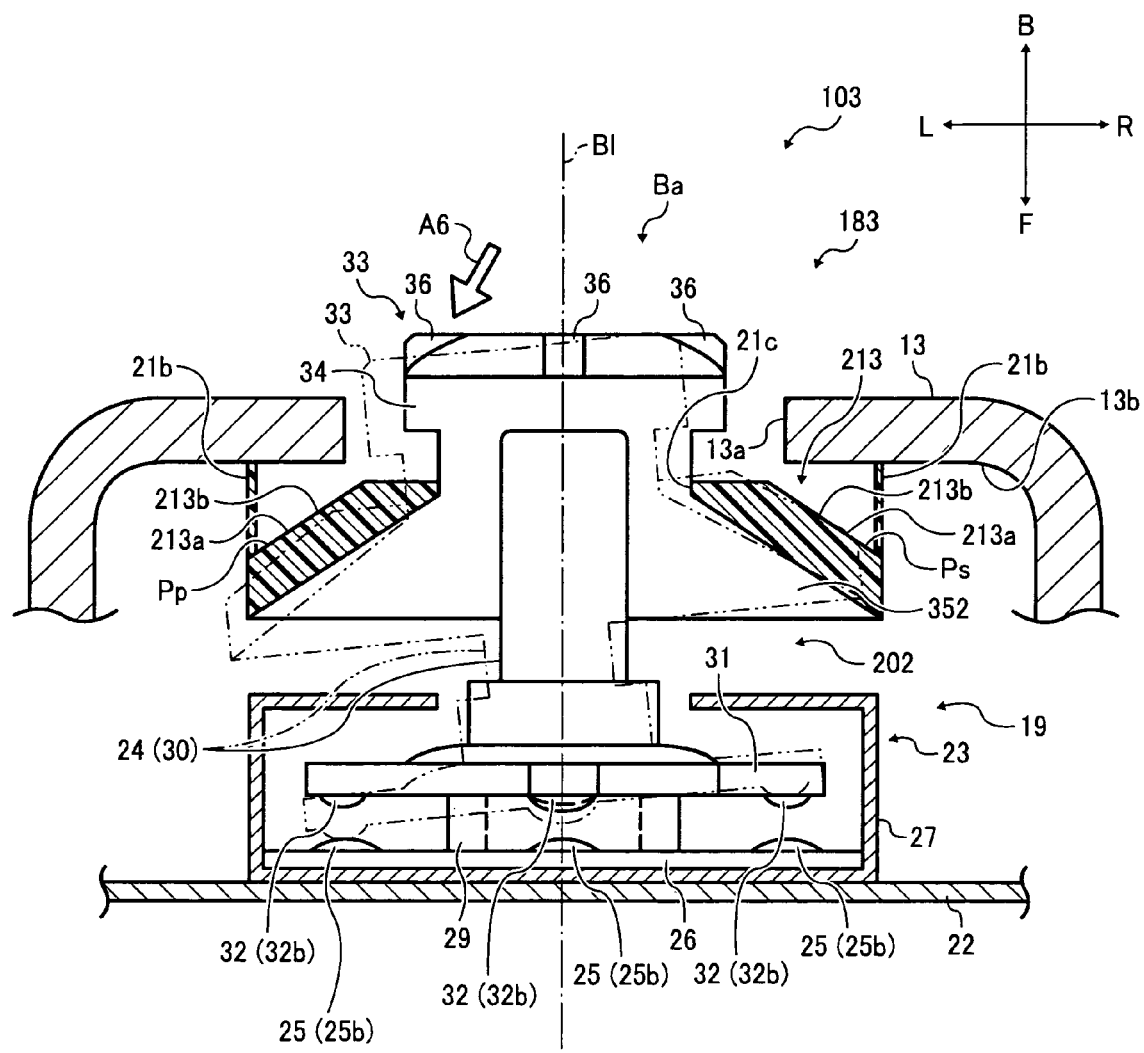
FIG. 19 is an explanatory view obtained along a line VI-VI of FIG. 18, which is the same as FIG. 8.
Figure 20:
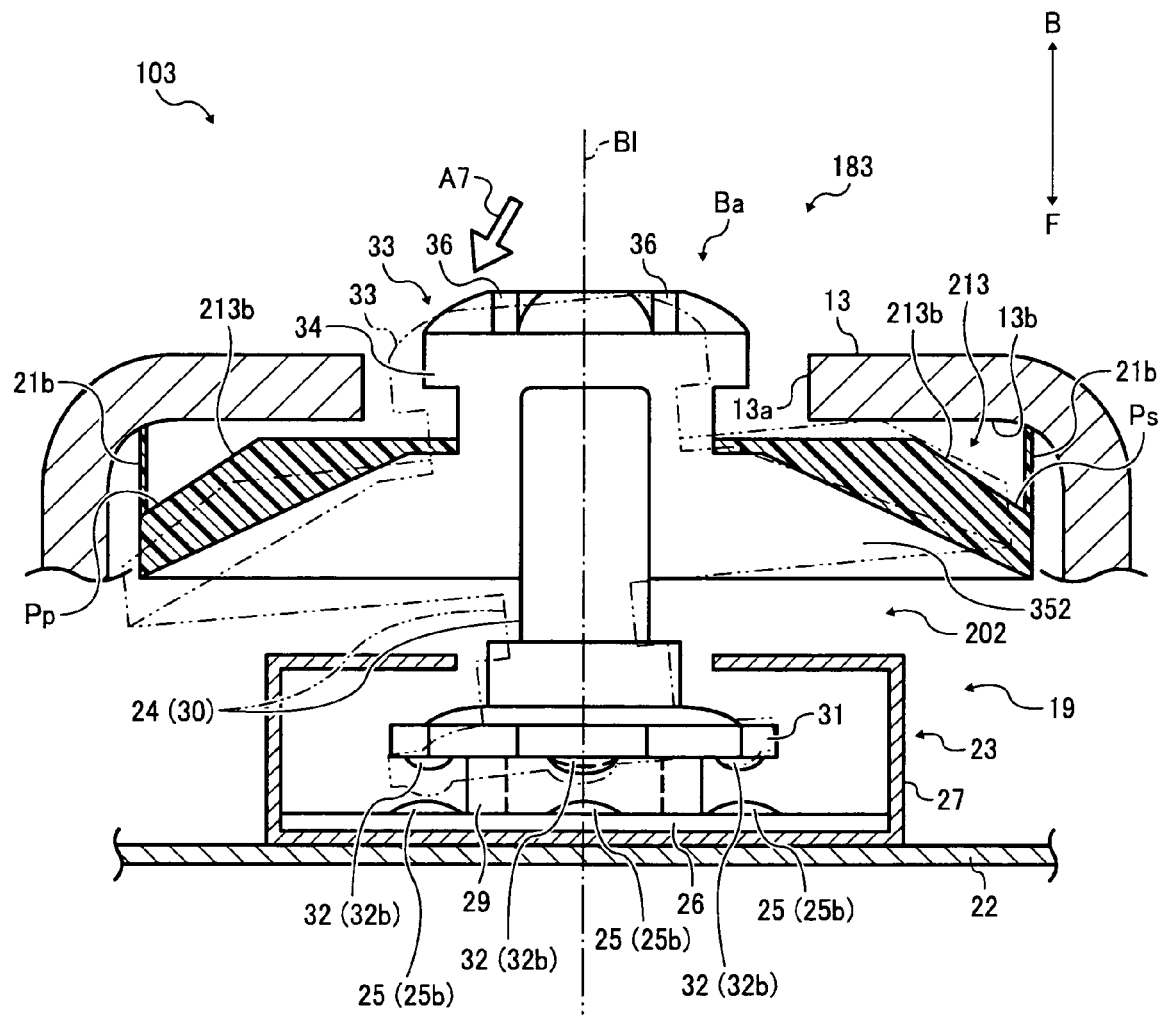
FIG. 20 is an explanatory view obtained along a line VII-VII of FIG. 18, which is the same as FIG. 9.

Next, a camera 103 according to an embodiment 3 of the present invention will be explained. A direction indicating switch 183 installed in the camera 103 of the embodiment 3 is an example which has a partially different structure from the direction indicating switch 182 of the camera 102 according to the embodiment 2. A basic structure of the camera 103 is the same as the camera 102 of the embodiment 2, therefore the same numerals denote the same functional parts of the embodiment 2 and detailed explanations will not be explained. FIG. 17 is an exploded schematic perspective view of the structure of the direction indicating switch 183, which is the same as FIG. 13. FIG. 18 is a schematic top view of the direction indicating switch 183, which is the same as FIG. 4. FIG. 19 is an explanatory view obtained along a line VI-VI of FIG. 18, which is the same as FIG. 8. FIG. 20 is an explanatory view obtained along a line VII-VII of FIG. 18, which is the same as FIG. 9. In FIG. 20, as well as FIG. 13, an outer rib part 21*b* extended to the back case 13 on a peripheral edge part of the flange part 352 is not illustrated for an easy understanding.

In the direction indicating switch 183 installed in the camera 103, a sealing member 213, as illustrated in FIG. 17, has a different structure from the direction indicating switch 182 according to the embodiment 2.

The sealing member 213 has a truncated quadrangular pyramid shape which fits the flange part 352 of the operating cap 202, and in which four ridge line parts 213*b* are formed by four inclined side surfaces 213*a*. In other words, except that the projected ridge line parts 212*b* are not provided in four ridge line parts, the sealing member 213 has a same structure as the sealing member 212 of the direction indicating switch 182 according to the embodiment 2. As for the sealing member 213, as well as the sealing member 212 of the direction indicating switch 182 according to the embodiment 2, inclined side surfaces 213*a* are set to be in middle positions of four predetermined directions which are set in up, down, right and left directions. In the sealing member 213, a width of a cross section along a predetermined indicating direction (See FIG. 19) and a width of a cross section along a middle direction in two adjacent predetermined indicating directions (See FIG. 20) are different.

As for the direction indicating switch 183, in a case where pressed positions of the head part for operation 33 of the operating cap 202, as illustrated by an arrow A6 in FIGS. 18 and 19, are the indicating parts 36 of the head part for operation 33 of the indicating cap 202, the stick part for operation 30 of the operating section 24 of the switching device 19 is tilted in a predetermined indicating direction A6 from the reference position Ba (See the operating section 24 illustrated by a two-dot chain line in FIG. 19), and a contact point for indicating on the side of the operating section 32*b* placed in the indicating direction A6 viewed from the reference line B1 abuts on a contact point for indicating on the side of the base 25*b*, and they are mutually in a conductive state.

As for the direction indicating switch 183, in a case where pressed positions of the head part for operation 33 of the operating cap 202, as illustrated by an arrow A7 in FIGS. 18 and 20, are not the indicating parts 36 of the head part for operation 33 of the indicating cap 20 (in an illustrated example, a middle position between two mutually adjacent indicating parts 36), the stick part for operation 30 of the operating section 24 of the switching device 19 is tilted in a direction A7 different from a predetermined indicating direction from the reference position Ba. In the sealing member 213, the ridge line part 213*b* is placed in a position in a point symmetric direction Ps, which is a point symmetry in regard to the indicating direction A7, and thereby the ridge line part 213*b* abuts on the back case 13, and the stick part for operation 30 (the operating section 24) is prevented from tilting to an angle (to the reference line B1) where two contact points for indicating on the side of the operating section 32 placed to have the indicating direction A7 in between abut on contact points for indicating on the side of the base 25*b* respectively facing (See the operating section 24 illustrated by a two-dot chain line in FIG. 20).

Therefore, as for the direction indicating switch 183, in a case where the tilt operation is performed in the direction different from the predetermined indicating direction, compared to a case where the tilt operation is performed in the predetermined direction, when the reference line B1 is taken as a reference, a tilt of the stick part for operation 30 (the operating section 24) is prevented at a small angle, and no directions are specified. And thereby, if one who operates the direction indicating switch 183, that is, a user of the camera 103, performs the tilt operation in the direction different from a proper indicating direction, there is no possibility that the indicating direction against a user's intention is specified, the indicating direction is not specified though the tilt operation is performed to an angle which is equal to a case where the tilt operation is performed in the predetermined indicating direction, and the user feels a sense of incongruity.

Thus, it is possible for the camera 103 to recognize if the tilt operation performed on the direction indicating switch 183 is that from the reference line B1 toward the proper indicating direction or not by a feeling of the tilt operation, so that a proper tilt operation is performed with the feeling of the tilt operation and a desired function of various functions is chosen properly. This, in particular, is effective for a case where a user operates the direction indicating switch 183 looking in the optical finder 16.

In addition, as for the direction indicating switch 183, in a case where the tilt operation is performed in the direction different from the predetermined indicating direction viewed from the reference line B1, if the ridge line part 213*b* abuts on the back case 13, a tilt of the stick part for operation 30 of the operating section 24 of the switching device 19 does not stop immediately but as a tilt angle from the reference line B1 becomes larger, and a reaction force in regard to the tilt operation becomes gradually larger, because the ridge line part 213*b* which abuts on the back case 13 is formed by an elastic-deformable material. Therefore, when a user of the camera 103 performs the tilt operation of the direction indicating switch 183, it is possible for the user to recognize if a direction of the tilt operation is appropriate or not by a difference of the reaction force. And thereby, a feeling of the tilt operation of the direction indicating switch 183, that is, a feeling of an operation of the camera 103 can be recognized more clearly.

Therefore, as for the camera 103 according to the embodiment 3 of the present invention, it is possible to prevent the operating section 24 of the direction indicating switch 183 from tilting in an improper direction, that is, it is possible to prevent an operational error.

Embodiment 4

Next, a camera 104 according to an embodiment 4 of the present invention will be explained. Firstly, a background which led to a structure of the camera 104 according to the embodiment 4 of the present invention will be described.

A camera provided with an operating switch which is tilted to perform a selection, an execution and so on of each function, from a viewpoint of a simple assembly work, is assembled such that an internal mechanism is formed to mount each component on a base board or the like and the internal mechanism is stored to attach to a case. For example, in each embodiment described above, after mounting the direction indicating switch 18 on the controlling base board 22, the direction indicating switch 18 is inserted into a switch opening 13a of the back case 13 from inside. Therefore, the switch opening 13a needs to have a diameter such that the operating cap 20 attached on the direction indicating switch 18 (particularly, the head part for operation 33) can be inserted into. And thereby, between the operating cap 20 and the switch opening 13a, a gap may be formed, which may make an impression of an external appearance of the camera 10 worse. In this case, it is conceivable that after storing the controlling base board on which the switching device 19 is mounted in a case 11, the operating cap 20 is attached to the stick part for operation 30 of the operating section 24 of the switching device 19 from outside of the back case 13. However, an assembly work may be complicated, and the operating cap 20 may be removed if a fixation of the operating cap 20 on the stick part for operation 30 is unfixed, therefore another method is desirable. It is also conceivable that a removal-stop member such as an E-shaped ring be attached to the operating cap 20 in order to prevent the operating cap 20 from becoming removed. However, the number of components may be increased and a complicated attachment work may be needed.

In addition, generally, in the operating switch which is tilted to perform a selection, an execution and so on of each function, it is easily possible to perform the tilt operation, when a spot where a user touches (for example, the head part for operation 33 of the operating cap 20, as for the direction indicating switch 18 described in each embodiment) is an appropriate size. However, in the operating switch which is tilted (the direction indicating switch 18), the larger the head part for operation 33 becomes, the larger a movement amount of an edge of the head part for operation 33 in regard to an inclination of the stick part for operation 30 of the switching device 19 becomes. And thereby it is necessary for a gap between the head part for operation 33 (the operating cap 20) and the switch opening 13a to be large. However, it is difficult for the head part for operation 33 to be a large one from a viewpoint of an external appearance quality.

In order to solve a problem described above, the camera 104 according to the embodiment 4 is structured such that it is possible to prevent a gap between an operating cap attached on an operating section of the operating switch which is tilt-operated and an opening in which the operating cap is exposed from the case member from being recognized visually.

Figure 21:
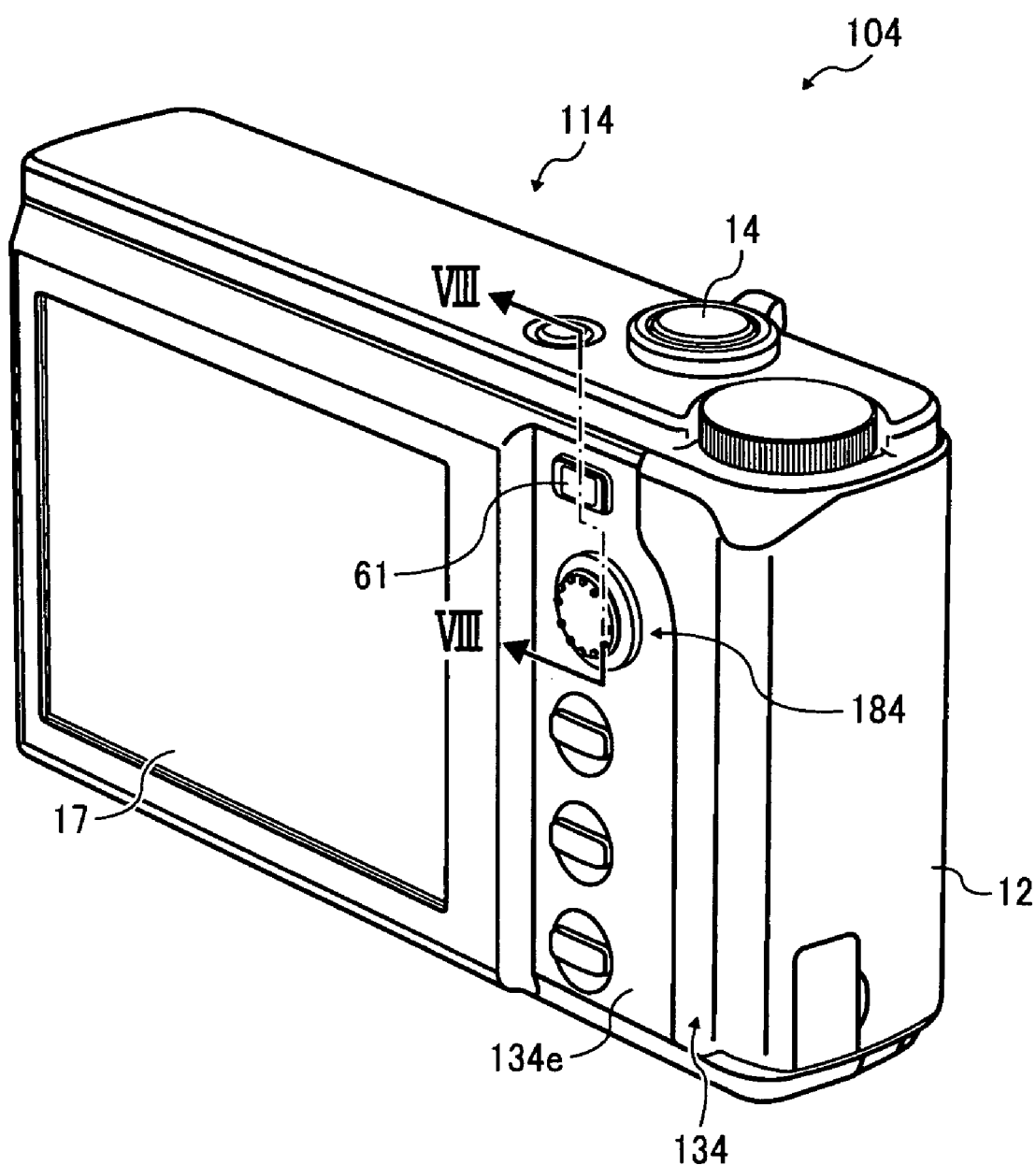
FIG. 21 is a schematic perspective view of a camera according to an embodiment 4 of the present invention from a reverse side.
Figure 22:
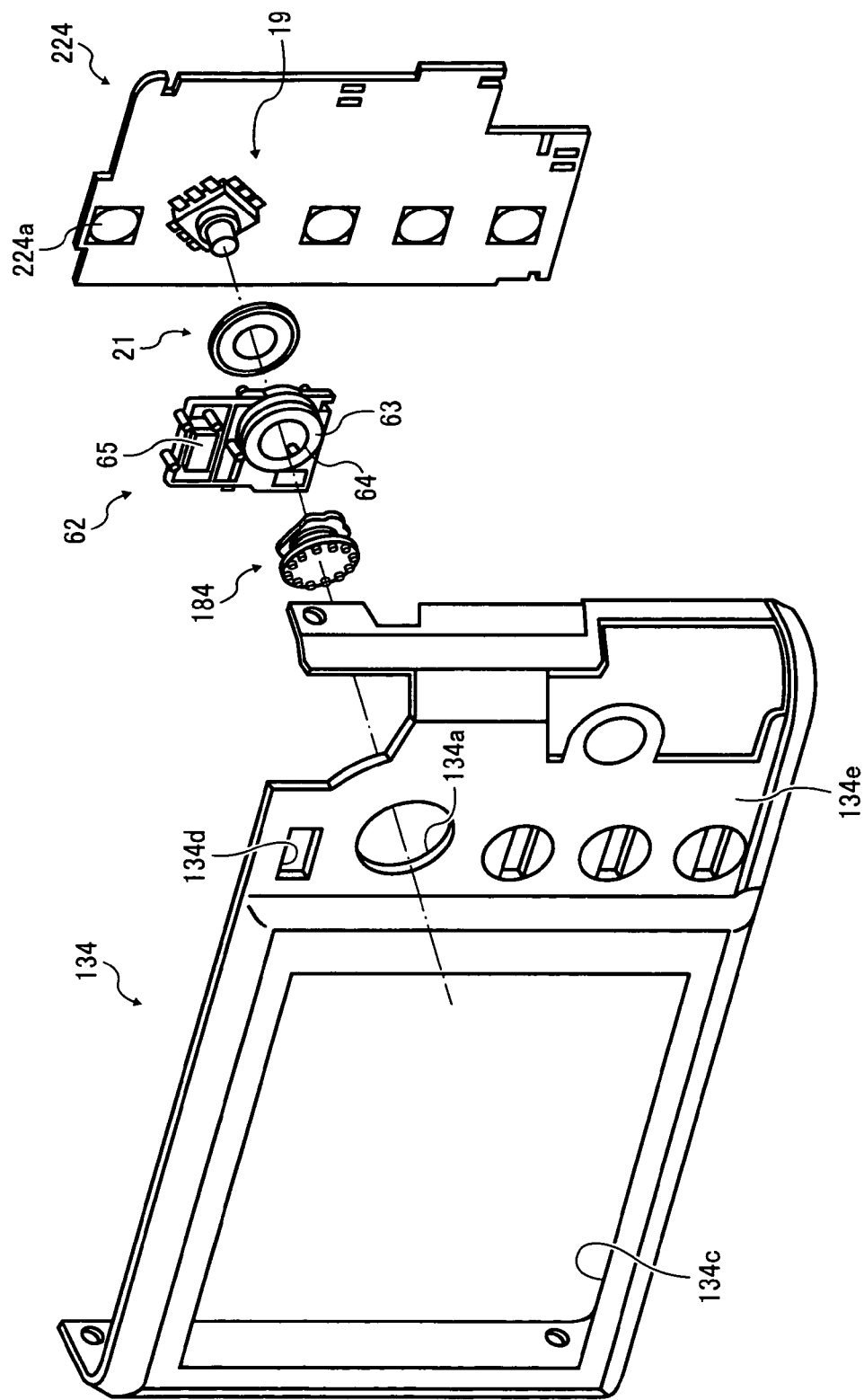
FIG. 22 is an exploded schematic perspective view of a peripheral structure of the direction indicating switch of the camera according to the embodiment 4 of the present invention, which is the same as FIG. 3.
Figure 23:
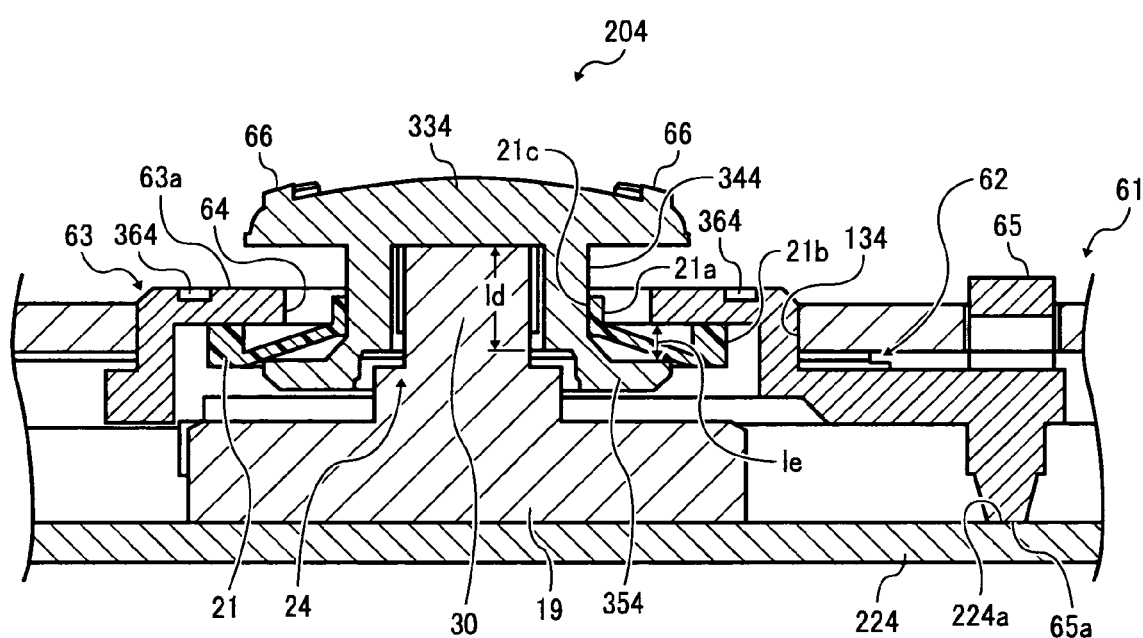
FIG. 23 is an explanatory view obtained along a line VIII-VIII of FIG. 21.
Figure 24A:
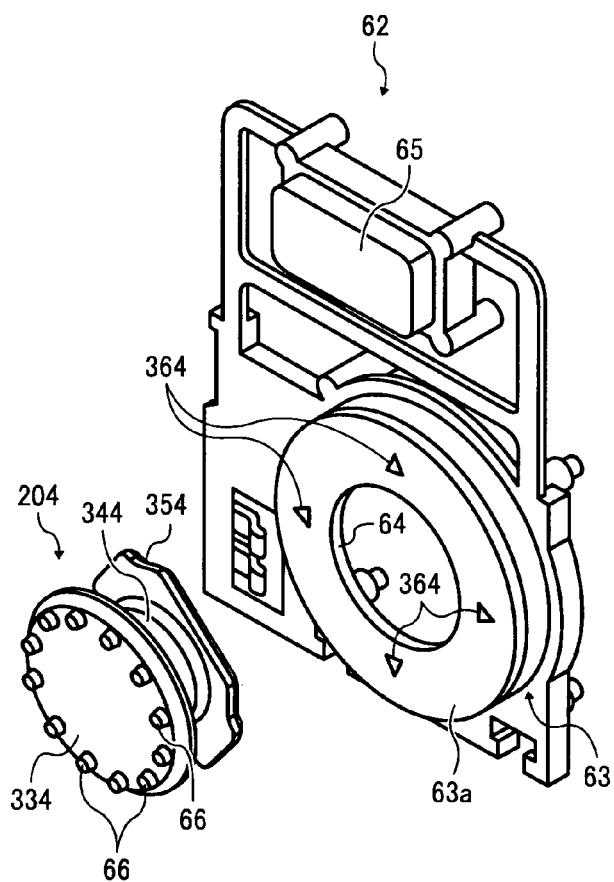
FIG. 24A is a schematic perspective view of a shielding member of the camera according to the embodiment 4 of the present invention, and describes a state before the operating cap is attached.
Figure 24B:
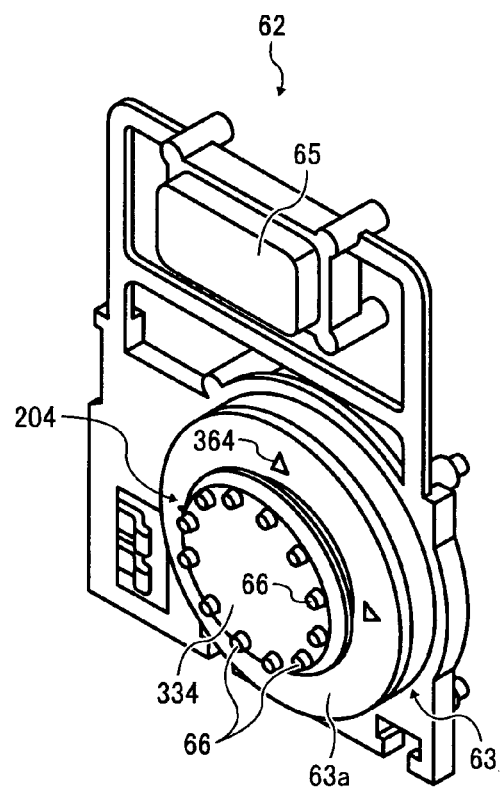
FIG. 24B is a schematic perspective view of the shielding member of the camera according to the embodiment 4 of the present invention, and describes a state that the operating cap is attached.
Figure 25:
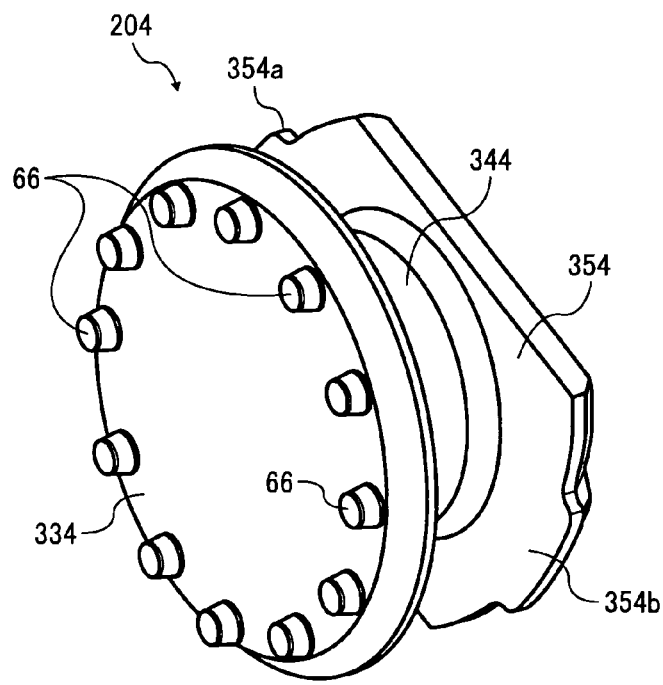
FIG. 25 is a schematic perspective view of the operating cap from a side of a head part for operation.
Figure 26:
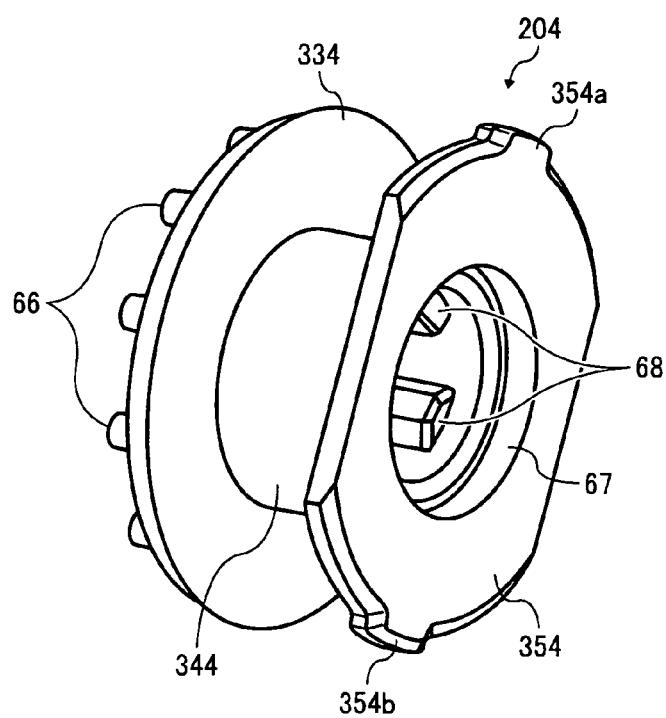
FIG. 26 is a schematic perspective view of the operating cap from a side of a flange part.
Figure 27:
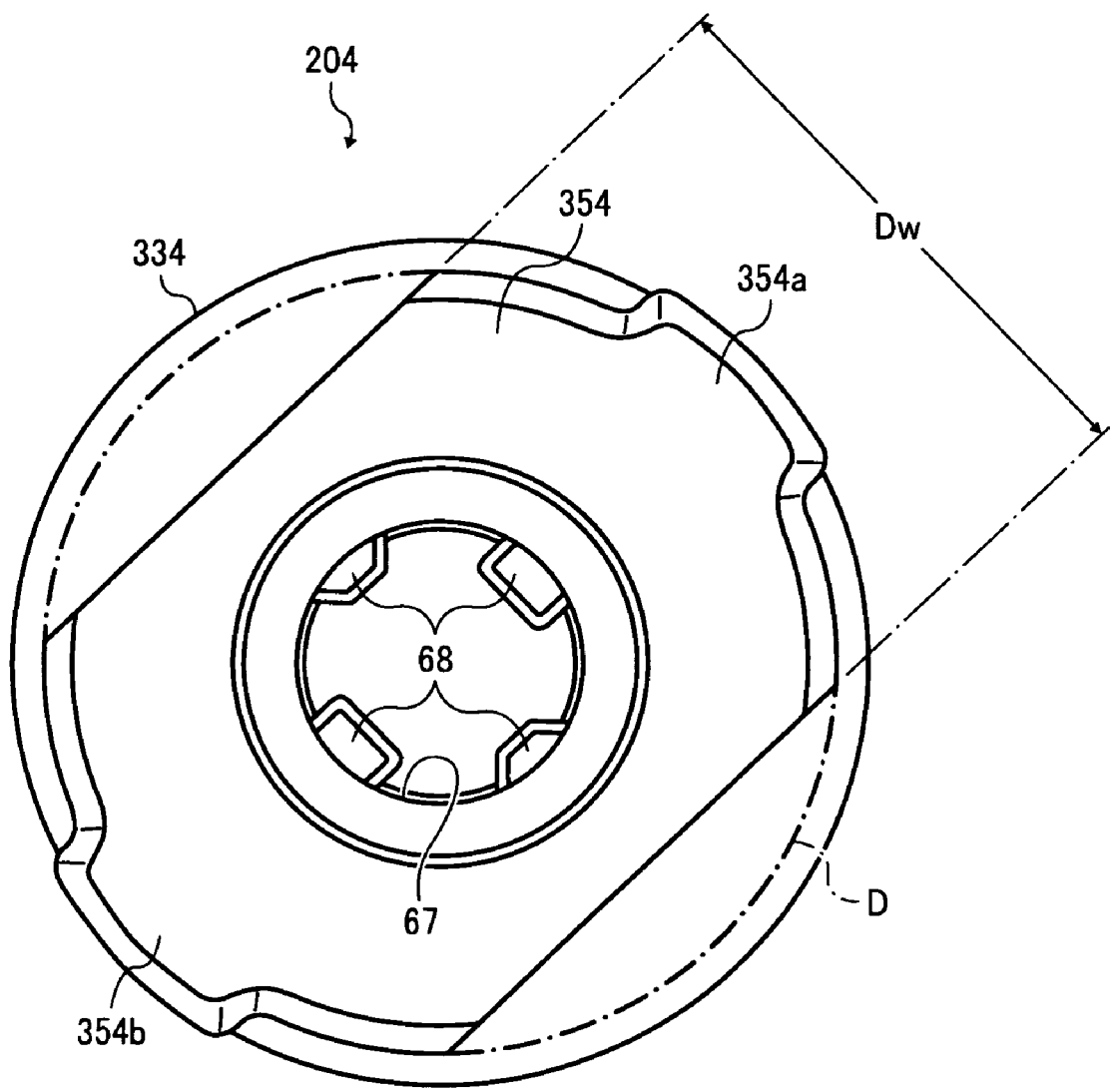
FIG. 27 is a schematic plain view of the operating cap from a side of a bottom surface of the flange part (a front side when the operating cap is attached to the camera).
Figure 28A:
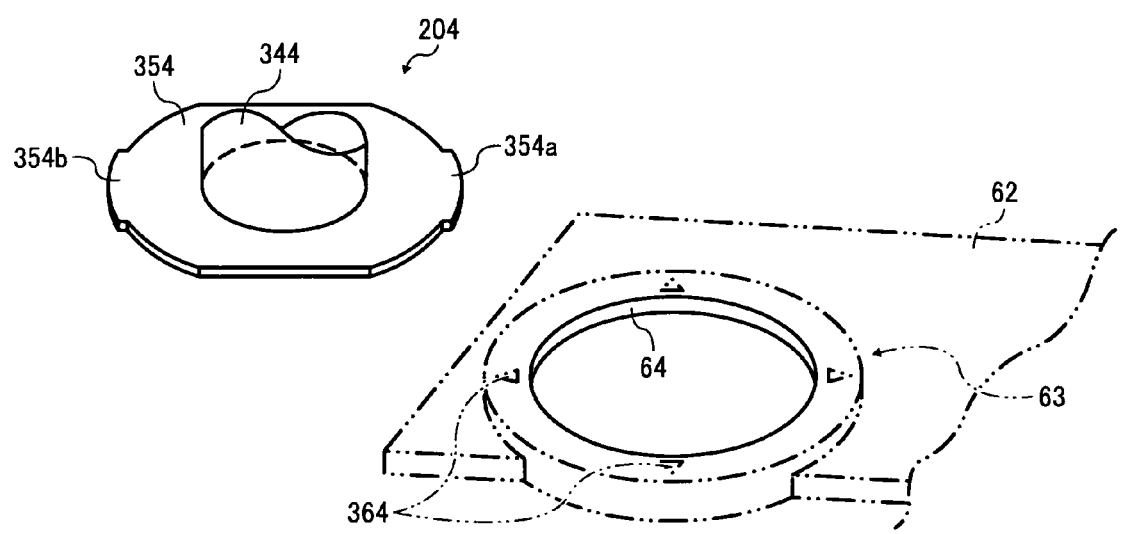
FIG. 28A is an explanatory view describing a state of the operating cap being inserted into the shielding member, and describes the state before the operating cap is inserted.
Figure 28B:
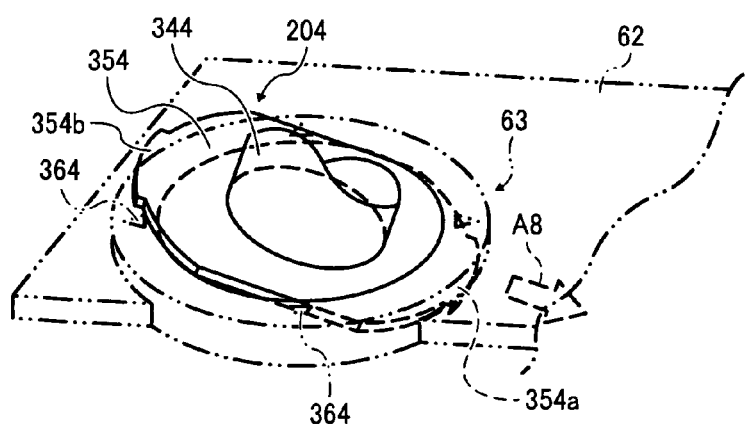
FIG. 28B is an explanatory view describing the state of the operating cap being inserted into the shielding member, and describes the state where the flange part of the operating cap starts being inserted into a through-hole of the shielding member.
Figure 28C:
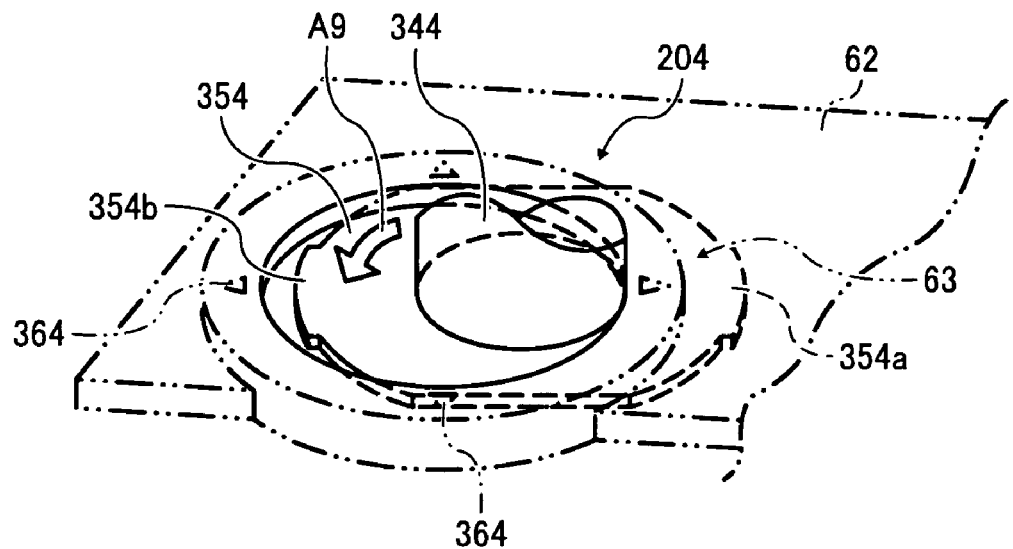
FIG. 28C is an explanatory view describing the state of the operating cap being inserted into the shielding member, and describes the state where the flange part of the operating cap finishes being inserted into the through-hole of the shielding member.
Figure 28D:
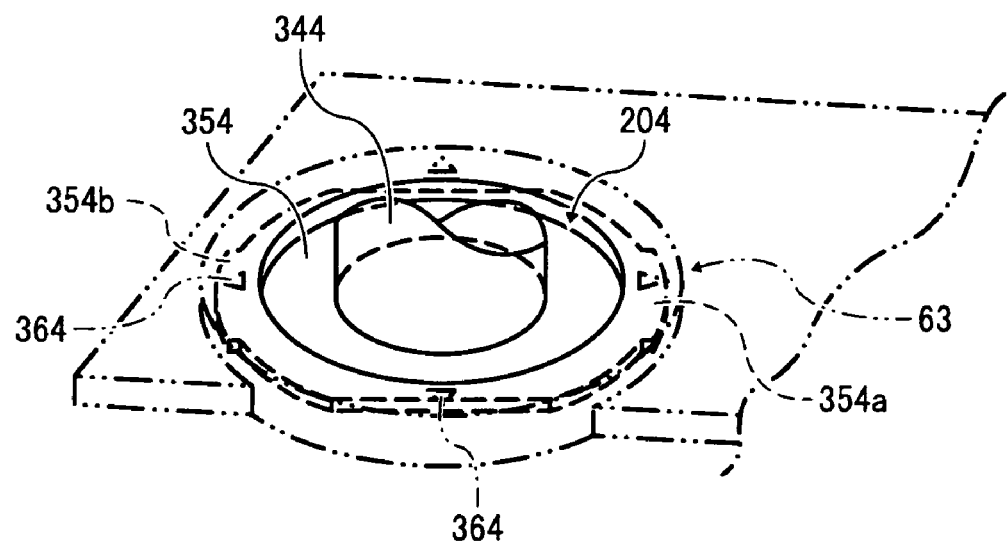
FIG. 28D is an explanatory view describing the state of the operating cap being inserted into the shielding member, and describes the state after the operating cap is inserted.
Figure 29A:
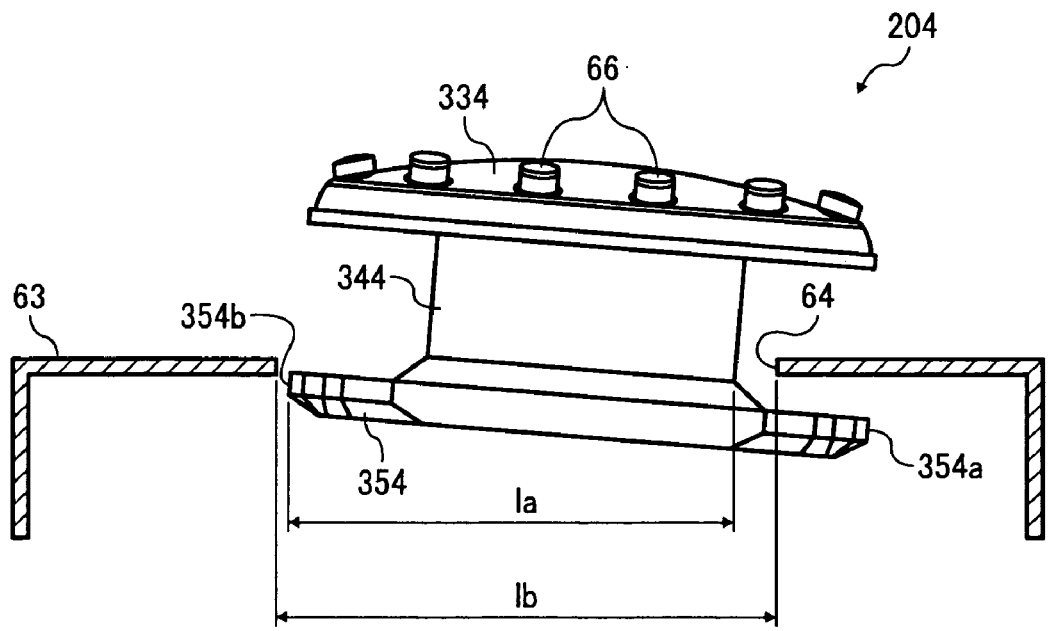
FIG. 29A is an explanatory view describing a relation between a size of each part of the operating cap and a length of an inner diameter of the through-hole of the shielding member, and describes a state where the flange part of the operating cap starts being inserted into the through-hole of the shielding member.
Figure 29B:
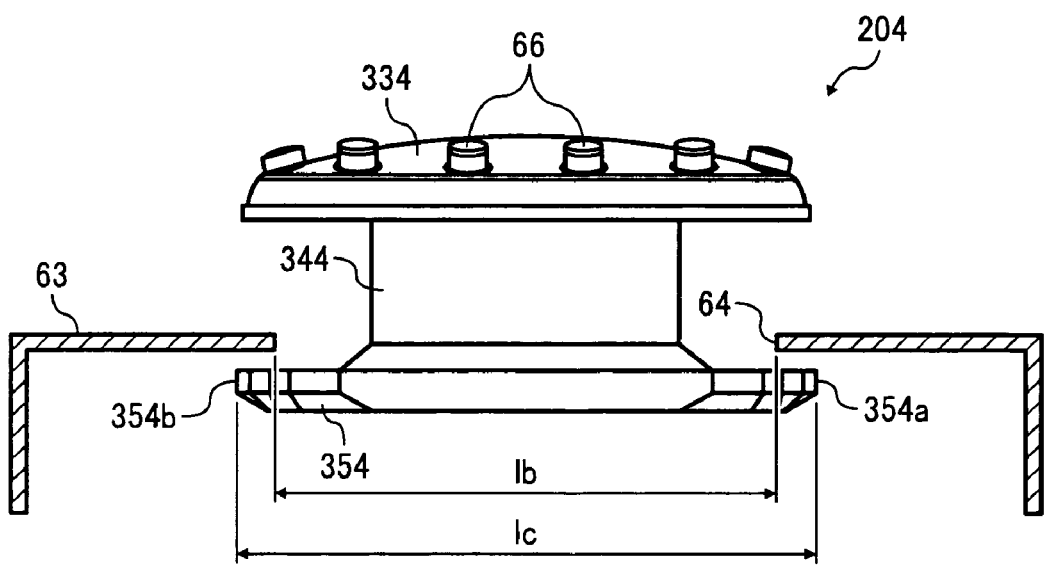
FIG. 29B is an explanatory view describing the relation between the size of each part of the operating cap and the length of the inner diameter of the through-hole of the shielding member, and describes a state where the flange part of the operating cap finishes being inserted into the through-hole of the shielding member.

Next, a structure of the camera 104 will be described. The camera 104 is an example such that a direction indicating switch 184 installed in the camera 104 and its periphery, are structured differently from the direction indicating switch 18 and its periphery of the camera 10 according to the embodiment 1. A basic structure of the camera 104 is the same as the camera 10 of the embodiment 1, therefore the same numerals denote the same functional parts of the embodiment 1 and detailed explanations will not be described. FIG. 21 is a schematic perspective view of the camera 104 according to the embodiment 4 from the reverse side. FIG. 22 is an exploded schematic perspective view of a peripheral structure of the direction indicating switch 184 of the camera 104, which is the same as FIG. 3. FIG. 23 is an explanatory view obtained along a line VIII-VIII of FIG. 21. In FIG. 23, an internal structure of the switching device 19 is not illustrated for an easy understanding. FIG. 24A is a schematic perspective view of a shielding member 62 and describes a state before an operating cap 204 is attached. FIG. 24B is a schematic perspective view of the shielding member 62 and describes the state where the operating cap 204 is attached. FIG. 25 is a schematic perspective view of the operating cap 204 from a side of a head part for operation 334. FIG. 26 is a schematic perspective view of the operating cap 204 from a side of a flange part 354. FIG. 27 is a schematic plain view of the operating cap 204 from a side of a bottom surface of the flange part 354 (a front side when the operating cap 204 is attached to the camera 104). FIG. 28A is an explanatory view describing a state of the operating cap 204 being inserted into the shielding member 62 and describes the state before the operating cap 204 is inserted. FIG. 28B is an explanatory view describing a condition of the operating cap 204 being inserted into the shielding member 62 and describes the state where the flange part 354 of the operating cap 204 starts being inserted into a through-hole 64 of the shielding member 62. FIG. 28C is an explanatory view describing a state of the operating cap 204 being inserted into the shielding member 62 and describes the state where the flange part 354 of the operating cap 204 finishes being inserted into the through-hole 64 of the shielding member 62. FIG. 28D is an explanatory view describing a state of the operating cap 204 being inserted into the shielding member 62 and describes the state after the operating cap 204 is inserted. FIG. 29A is an explanatory view describing a relation of a size of each part of the operating cap 204 and a length of an inner diameter of the through-hole 64 of the shielding member 62 and describes a state where the flange part 354 of the operating cap 204 starts inserting into the through-hole 64 of the shielding member 62. FIG. 29B is an explanatory view describing a relation of size of each part of the operating cap 204 and an inner diameter of the through-hole 64 of the shielding member 62.

In the camera 104, as illustrated in FIG. 21, a reproduction switch 61 is provided above the direction indicating switch 184. The reproduction switch 61 is a press-operated operating section, in order to reproduce (project) a still image or a moving image of a photographing subject already obtained on a liquid crystal display 17.

In the camera 104, a back case 134 of a case 114 has a different structure from the back case 13 of the case 11 of the camera 10 according to the embodiment 1. In the back case 134, as illustrated in FIG. 22, a switch opening 134a for the direction indicating switch 184, a display opening 134c for the liquid crystal display 17, and a slit opening 134d for the reproduction switch 61 are provided. In the back case 134, a peripheral wall part which determines the switch opening 134a is flat. A projected stand part 63 of the shielding member 62 is fitted into the switch opening 134a of the back case 134.

The shielding member 62 is formed by a material having a flexibility, as illustrated in FIGS. 24A and 24B, and has entirely a plate-shape on which the projected stand part 63 is provided. In the embodiment 4, for example, the shielding member 62 is formed of a resin material by a mold forming. The projected stand part 63 is structured such that the through-hole 64 which penetrates the shielding member 62 is provided in a cylinder-shape spot, and has entirely a cylinder-shape. In the projected stand part 63, an outer diameter has a size which is capable of fitting into the switch opening 134a of the back case 134, and an inner diameter has a size which satisfies a predetermined condition for the flange part 354 of the operating cap 204 as described later. On an annular top surface 63a of the projected stand part 63 (back side in a state of assembled as the camera 104), four indicating parts 364 are provided. Each of the four indicating parts 364, in the state of assembled as the camera 104 (See FIG. 24B), is placed outside of an outer edge of the head part for operation 334 of the operating cap 204, and is placed in up, down, right and left directions centering on an axis of the head part for operation 334. The four indicating parts 364 indicate directions of the proper tilt operation of the operating section 24 of the switching device 19 as well as the four indicating parts 36 of the camera 10 according to the embodiment 1.

In addition, as for the camera 104 according to the embodiment 4, a pressed part 65 for the reproduction switch 61 is provided with the shielding member 62. The pressed part 65 is structured such that the shielding member 62 is partially projected upward (backward in the state of assembled as the camera 104), and a size of the pressed part 65 is capable of fitting loosely into the slit opening 134d of the back case 134. When the pressed part 65, in a state where the shielding member 62 is mounted on a controlling base board 224, is pressed down from above for only a predetermined amount (from back to front in the state of being assembled as the camera 104), however which is not illustrated, a contact point for indicating on the side of the shielding member 65a provided on the shielding member 62 (See FIG. 23) and a contact point for indicating on the side of the base board 224a provided on the controlling base board 224 (See FIG. 23) are structured to be in a conductive state. Thus, when a contact point between both of the contact points is in the conductive state, the conductive state is transmitted to the controlling base board 224 via the shielding member 62 (the pressed part 35) as an electric signal, and thereby it is possible for the reproduction switch 61 to perform a reproduction movement by a pressed operation by the pressed part 65.

The operating cap 204 is inserted into the through-hole 64 of the projected stand part 63 of the shielding member 62. The operating cap 204 is attached to the stick part for operation 30 of the operating section 24 (See FIG. 6 and so on) of the switching device 19 mounted on the controlling base board 224. The operating cap 204, as illustrated in FIGS. 25 to 27, has the head part for operation 334 which has entirely a disc-shape, and the flange part 354 which is continued via a neck part 334 under the head part for operation 334 (forward in a state of being attached to the camera 104). The head part for operation 334 has a larger outer diameter than an inner diameter of the through-hole 64 of the projected stand part 63 of the shielding member 62. A plurality of convexed parts 66 is provided on an edge part of a surface (a surface which is exposed from a case 114 and placed in a back side in the state of being attached to the camera 104) of the head part for operation 334. Each convexed part 66 is provided mutually at equal intervals and functions as a slip stopper in a case where the head part for operation 334 performs the tilt operation or the pressed operation.

A fitting hole 67, which extends from a rear surface (front surface in the state of being attached to the camera 104) of the flange part 354 and the flange part 354 through the neck part 344, is provided in the operating cap 204. The fitting hole 67 has four supporting projected parts 68 which are projected inward (See FIG. 27), and is capable of accepting the stick part for operation 30 so as to correspond to each other's axes. In the operating cap 204, as illustrated in FIG. 23, a depth (length) 1d of the fitting hole 67, which accepts the stick part for operation 30, is longer than an interval 1e between the flange part 354 and a peripheral wall part which determines the through-hole 64 of the projected stand part 63 of the shielding member 62 in a state where the operating cap 204 and the shielding member 62 are mounted on the controlling base board 224. The interval 1e is an interval in a state where the operating cap 204, that is, the switching device 19, is not tilted.

The flange part 354 of the operating cap 204 has entirely a shape in which both sides of a disc-shape member (See symbol D illustrated by a two-dot chain line in FIG. 27) are cut away by flat surfaces parallel to each other. The flange part 354 satisfies a predetermined condition for the inner diameter of the through-hole 64 of the shielding member 62 as described above. Specifically, in the flange part 354, the outer diameter of the disc-shape member D is larger than the inner diameter of the through-hole 64 and a diameter Dw which is smaller by cutting-away is smaller than the inner diameter of the through-hole 64. And thereby, it is possible for the operating cap 204 to insert into the through-hole 64 of the shielding member 62 of the flange part 354, and in a state where the flange part 354 is inserted into the through-hole 64, and when axes of the through-hole 64 and the operating cap 204 correspond to each other, the flange part 354 engages with the peripheral wall part which determines the through-hole 64 and it is possible to prevent the flange part 354 from slipping from the through-hole 64. In the operating cap 204 of the embodiment 4, flange projected parts 354a and 354b are formed at both ends viewed in a direction along a surface at a spot of cutting-away, in the flange part 354.

As for the camera 104, when assembling, firstly, the operating cap 20 is attached to the shielding member 62. By using FIGS. 28A to 28D, a method of assembling will be explained.

As illustrated in FIG. 28A, a longer diameter (a distance between both flange projected parts 354a and 354b) of the flange part 354 of the operating cap 204 is larger than the through-hole 64 which is provided in the projected stand part 63 of the shielding member 62. Therefore, as illustrated in FIG. 28B, the operating cap 204 is slanted to the shielding member 62 and inserted into the through-hole 64 from a side of one end (for example, a flange projected part 354a) of the longer diameter of the flange part 354 (See an arrow A8). Then, the neck part 344 is closer to a peripheral edge of the through-hole 64 and other end (for example, a flange projected part 354b) of the longer diameter of the flange part 354, that is, a whole of the flange part 354 is inserted into the through-hole 64 (See an arrow A9) (See FIG. 28C). Then after, when a positional relationship in which the axes of the operating cap 204 and the through-hole 64 correspond to each other, it is possible to prevent the operating cap 204 from slipping from the shielding member 62 (the projected stand part 63 or the through-hole 64) by an engagement with the flange part 354 and the through-hole 64 (See FIG. 28D). Therefore, the operating cap 204 satisfies predetermined conditions between the through-hole 64 of the shielding member 62. By using FIGS. 29A and 29B, the predetermined conditions will be explained.

In the operating cap 204, a length from the other end of the longer diameter of the flange part 354 (the flange projected part 354b) to a boundary between the neck part 344 and the one end of the longer diameter of the flange part 354 (the flange projected part 354a) is 1a, and an inner diameter of the through-hole 64 is 1b (See FIG. 29A). The longer diameter of the flange part 354 (a maximum value) is 1c (See FIG. 29B). If a minimum diameter Dw is smaller than 1b (i.e. Dw<1b) and 1a is smaller than 1b (i.e. 1a<1b) in the flange part 354, it is possible for the flange part 354 to be inserted into the through-hole 64. In addition, if 1b is smaller than 1c (i.e. 1b<1c), the flange part 354 engages with the through-hole 64, in a state where axes of the operating cap 204 and the through-hole 64 correspond to each other.

The sealing member 21 is attached to the operating cap 204 which is attached to the shielding member 62 (See FIGS. 22 and 23). The sealing member 21, presses and spreads an inner opening part 21c which is determined by an inner rib part 21b, inserts the flange part 354 of the operating cap 204 into the inner opening part 21c, and then is attached to the operating cap 204. As illustrated in FIG. 23, the inner opening part 21c of the sealing member 21 is in close contact with the neck part 344 of the operating cap 204 so as to encircle, the outer rib part 21b of the sealing member 21 abuts on the peripheral wall part which determines the through-hole 64 of the shielding member 62 from inside (inside of the case 11), and a gap between the through-hole 64 and the operating cap 204 is shielded. And thereby, it is possible to prevent dust and the like from entering the case 11 from the through-hole 64.

The operating cap 204 to which the sealing member 21 is attached, is attached to the stick part for operation 30 of the operating section 24 of the switching device 19 fixed on the controlling base board 224. The shielding member 62 to which the operating cap 204 is attached, is attached to the controlling base board 224 and the switching device 19. And thereby, an axis of the operating cap 204 and an axis of the through-hole 64 of the projected stand part 63 have a positional relationship to correspond to each other. When the controlling base board 224 in which the switching device 19, the shielding member 62, the sealing member 21 and the operating cap 204 are installed, is stored properly in the case 114 (the back case 134), the projected stand part 63 is fitted in the switch opening 134a and projected outward therefrom, and the head part for operation 334 of the operating cap 204 is placed on the projected stand part 63 (back in a state of being assembled as the camera 104). In addition, the pressed part 65 provided on the shielding member 62 is exposed outward from the slit opening 134d of the back case 134. Thus, the reproduction switch 61 is structured.

The camera 104 assembled as described above obtains effects from (1) to (7) as follows.

(1)
For example, in the direction indicating switch 184, as illustrated in FIG. 23, the head part for operation 334 of the operating cap 204 which has a larger diameter than the through-hole 64 is placed above (back in the state of being assembled as the camera 104) the through-hole 64 of the projected stand part 63 where the operating cap 204 is inserted into, and thereby it is possible to prevent a gap between the operating cap 204 and the through-hole 64 from being recognized visually. Therefore, it is possible to improve an impression of an external appearance of the camera 104.

(2)
For example, in the direction indicating switch 184, the operating cap 204 attached to the shielding member 62, is attached properly to the stick part for operation 30 of operating section 24 of the switching device 19, and the shielding member 62 is attached properly to the controlling base board 224. And thereby the operating cap 204 and the through-hole 64 of the projected stand part 63 of the shielding member 62 are in a positional relationship such that axes of each other's correspond to each other. In a state as above, the flange part 354 of the operating cap 204 is structured to engage with the through-hole 64 (the peripheral wall part which determines the through-hole 64) of the shielding member 62 extended to a reverse side of the back case 13 (inside of the case 11).

Therefore, if a fixation of the operating cap 204 to the stick part for operation 30 slips, it is possible to prevent the operating cap 204 from slipping from the through-hole 64 of the shielding member 62, that is, the camera 104, by a collaboration of a positioning action by insertion of the stick part for operation 30 to the fitting hole 67 of the operating cap 204 and an engaging action with the through-hole 64 (the peripheral wall part which determines the through-hole 64) of the flange part 354 of the operating cap 204. This is because the depth (length) 1d (See FIG. 23) of the fitting hole 67, which accepts the stick-shape part for operation 30, is larger than the interval 1e (See FIG. 23) between the flange part 354 which is in the state where the operating cap 204 and the shielding member 62 are mounted on the controlling base board 224, and the peripheral wall part which determines the through-hole 64 of the projected stand part 63 of the shielding member 62.

(3)
For example, in the direction indicating switch 184, the neck part 334 of the operating cap 204 having a smaller outer diameter than a diameter of the through-hole 64 is placed in the through-hole 64 of the projected stand part 63, and thereby it is possible for the operating cap 204 (including the head part for operation 334) to prevent an interference in the through-hole 64 caused by tilting for an operation of the switching device 19. Accordingly, even if the head part for operation 334 is larger, a gap between the operating cap 204 and the through-hole 64 does not need to be larger from a viewpoint of an interference prevention when tilting. Additionally, as described above, it is possible to prevent the gap between the operating cap 204 and the through-hole 64 from being recognized visually, and it is also possible for the head part for operation 334 of the operating cap 204 to be a size which is easy for a tilt operation.

(4)
For example, after installing the switching device 19, the shielding member 62, the sealing member 21 and the operating cap 204 in the controlling base board 224, the projected stand part 63 of the shielding member 62 is fitted to the switch opening 134a of the back case 13 to assemble, and this makes it possible for an assembly work to be easy.

(5)
For example, the flange part 354 of the operating cap 204 has a shape of the disc-shape member D having a larger diameter than an inner diameter of the through-hole 64 of the shielding member 62 in which both sides are cut away, and thereby it is possible for the flange part 354 of the operating cap 204 to be inserted in the through-hole 64 and to prevent from slipping from the through-hole 64. This makes it possible for a production of the operating cap 204, an attaching work of the operating cap 204 to the shielding member 62 and an assembly work of the camera 104 to be easy.

(6)
For example, the projected stand part 63 of the shielding member 62 is fitted to the switch opening 134a of the back case 13 and is projected, and four indicating parts 364 are provided on a top surface 63a of the projected stand part 63. Accordingly, it is possible for an existence of the switch opening 134a, which has an inner diameter capable of being inserted from inside of the case 11 of the head part for operation 334 which is big enough to be easy for a tilt operation, to be inconspicuous. This is because, as described in FIG. 21, on an outer wall surface 134e of the back case 134 (a surface placed in the back side in the state of being assembled as the camera 104), viewed from the back side of the camera 104, the top surface 63a of the projected stand part 63 on which the four indicating part 364 are provided is placed, so as to encircle the head part for operation 334 of the operating cap 204 which is an operating spot in the direction indicating switch 184. Therefore, the projected stand part 63 which is projected from the switch opening 134a externally appears to be a pedestal, on which the operating cap 204 which is a substantial operating spot is placed, highlights the four indicating part 364, and gives an impression to a user that it is a design which edges the head part for operation 334. Therefore, since an impression of the switch opening 134a filled in the projected stand part 63 is weakened relatively, the existence of the switch opening 134a is inconspicuous.

(7)

For example, the reproduction switch 61 is structured such that the pressed part 65 provided on the shielding member 62 is exposed outward from the slit opening 134d of the back case 134, and thereby it is possible to reduce the number of components.

In addition, for example, in the embodiment 4, the flange part 354 is structured to form a spot which is formed to have a smaller diameter Dw than the inner diameter of the through-hole 64 as the shape of the disc-shape member D having a larger diameter than an inner diameter of the through-hole 64 of the shielding member 62, in which both sides are cut away. However, the smaller diameter Dw may be a diameter having an uneven length which is capable of inserting to the through-hole 64 and engaging with the through-hole 64, and is not limited to the embodiment 4 described above.

Figure 30:
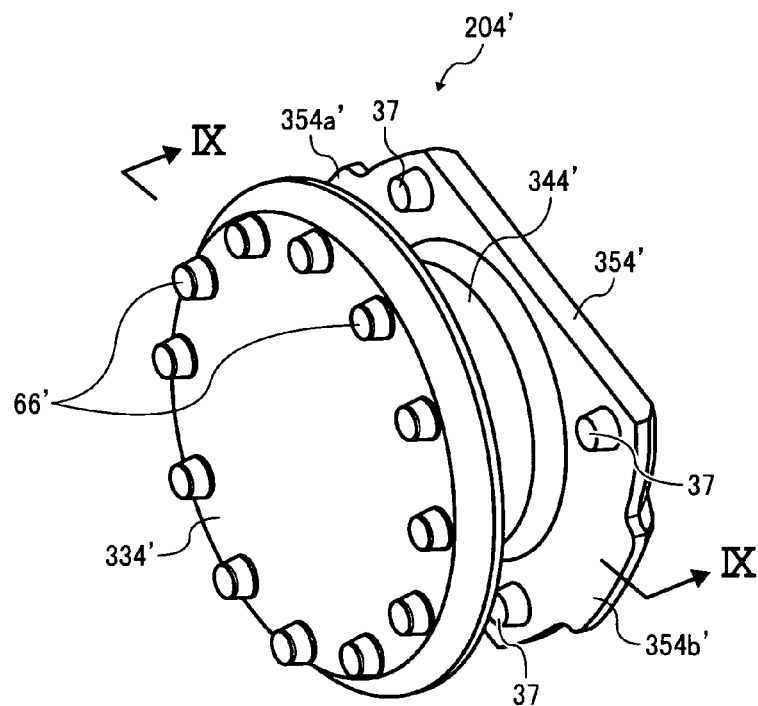
FIG. 30 is a schematic perspective view of another structure of the operating cap according to the embodiment 4 of the present invention.
Figure 31:
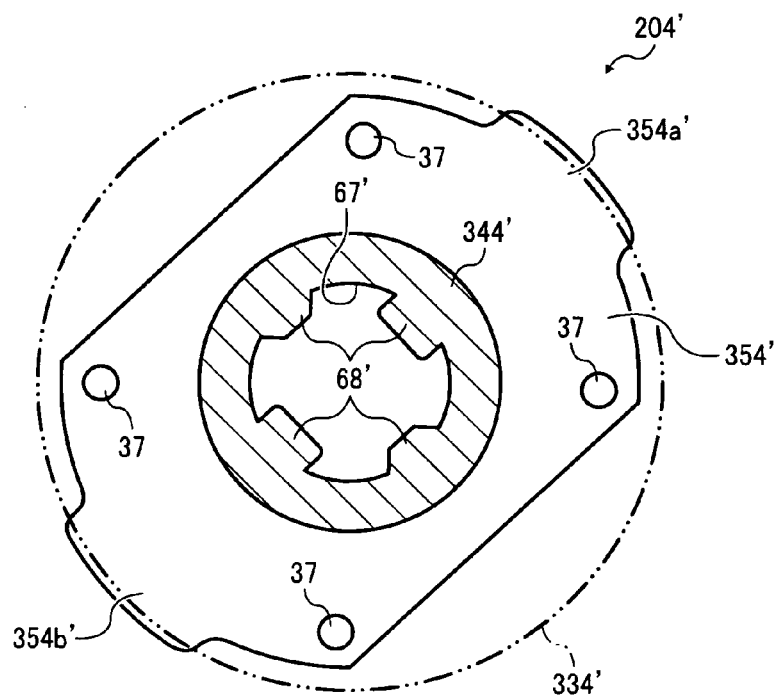
FIG. 31 is an explanatory view obtained along a line IX-IX of FIG. 30.
Figure 32:
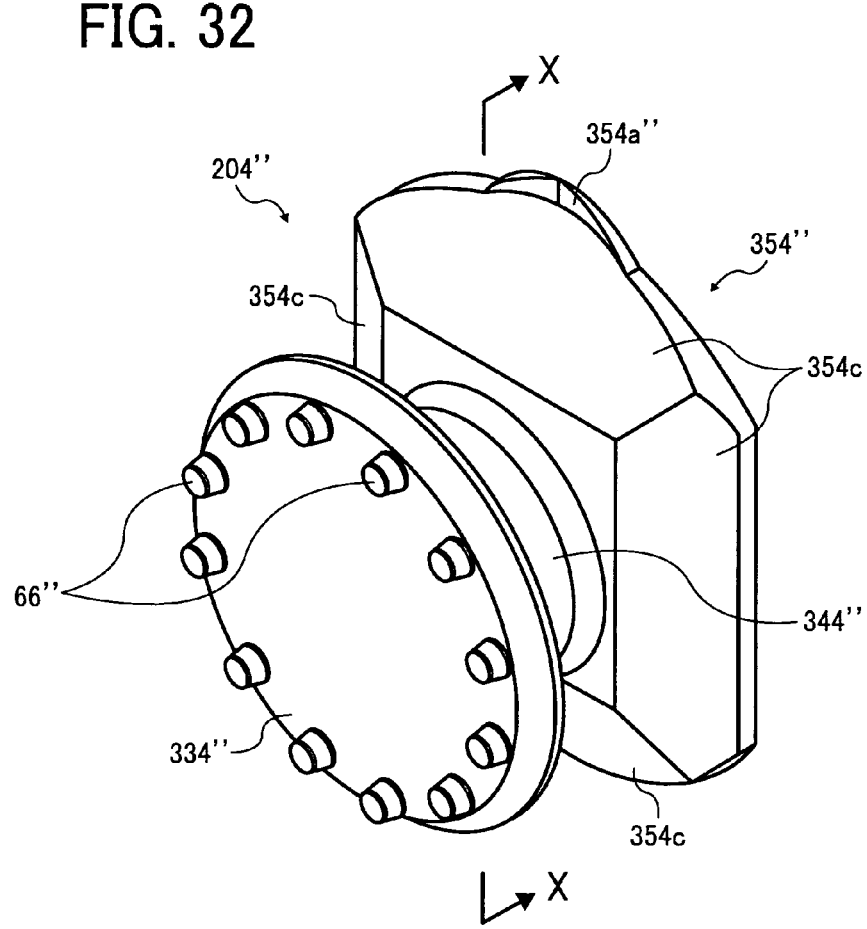
FIG. 32 is a schematic perspective view of still another structure of the operating cap according to the embodiment 4 of the present invention.
Figure 33:
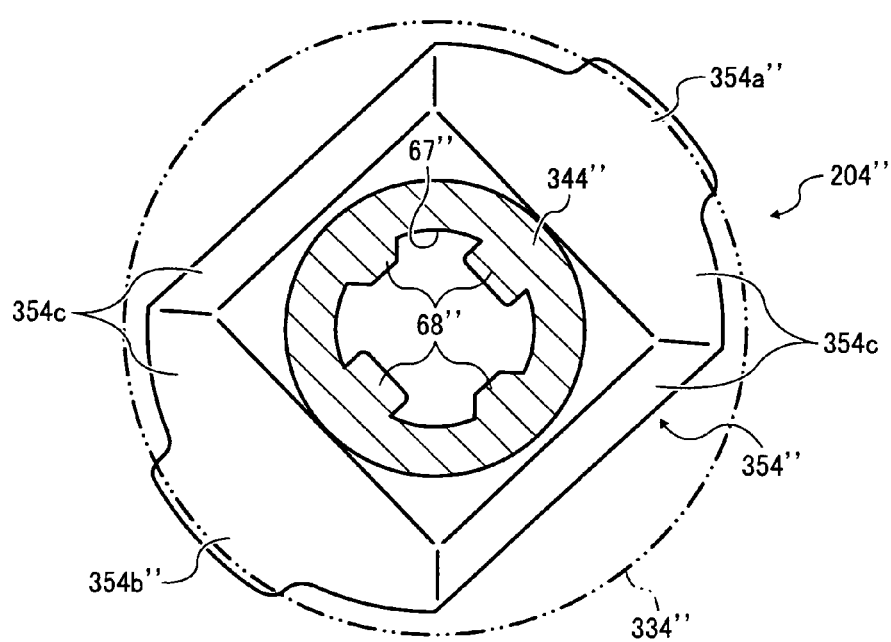
FIG. 33 is an explanatory view obtained along a line X-X of FIG. 32.

Furthermore, for example, in the embodiment 4, in the direction indicating switch 184, there is no part equivalent to the tilt controlling section according to the embodiments 1 to 3. However, a basic structure of the direction indicating switch 184 is similar to a structure of the direction indicating switch 18, and thereby it is possible to easily set up the part equivalent to the tilt controlling section. For example, as illustrated in FIGS. 30 and 31, by using an operating cap 204' having a flange part 354' on which four projected parts 37 are provided, it is possible to obtain effects which the camera 104 according to the embodiment 4 and the camera 10 according to the embodiment 1 have. Here, the four projected parts 37 may have a same structure as the four projected parts 37 provided on the flange part 35 of the operating cap 20 according to the embodiment 1. Additionally, as illustrated in FIGS. 32 and 33, an operating cap 204" may also be used. In the operating cap 204", a flange part 354" has a shape of a plate member having four inclined surfaces 354c as the flange part 352 of the operating cap 202 according to the embodiment 2 being cut out in a disc-shape, and being cut away on both sides by a parallel surface. By using the operating cap 204", it is possible to obtain effects which the camera 104 according to the embodiment 4 and the camera 102 according to the embodiment 2 (or the camera 103 according to the embodiment 3) have. In addition to the operating cap 204' and the operating cap 204", the sealing member 21' in which the projected part 37' is provided as the first variant example of the embodiment 1 may be used, or the sealing member 212 having a truncated quadrangular pyramid shape and on which the projected ridge line part 212b is provided as the embodiment 2 may be used, or the sealing member 213 having a truncated quadrangular pyramid shape without the projected ridge line part 212b as the embodiment 3 may be used.

Furthermore, for example, in the embodiment 4, a single pressed part 65 comprising the reproduction switch 61 is provided on the shielding member 62. However, on a shielding member, the projected stand part 63 in which the through-hole 64 is formed may be provided. An outer diameter of the projected stand part 63 may be capable of fitting into the switch opening 134a of the back case 134, and the through-hole 64 may allow an insertion of the flange part 354 of the opening cap 204 and may be capable of engaging with the flange part 354. The shielding member is not limited to the embodiment 4 described above. In addition, if a spot comprising a switch as the pressed part 65, is formed, this makes it possible to reduce the number of components. Accordingly, it is preferable to have such a shielding member not only having the single pressed part 65 as the embodiment 4 but also having a plurality of pressed parts.

Specific examples of the camera and the direction indicating switch installed thereon according to the embodiments of the present invention have been described above. For example, a direction indicating switch allows an operating section to tilt in a radial direction from a reference position and specifies a predetermined indicating direction by tilting over a predetermined angle in the predetermined indicating direction from the reference position. In the predetermined indicating direction, the direction indicating switch allows the operating section to tilt over the predetermined angle from the reference position, and in a direction different from the predetermined indicating direction, the direction indicating switch may be provided with a tilt controlling section (tilt controlling means) which prevents the operating section from tilting over the predetermined angle from the reference position. The direction indicating switch is not limited to each of the embodiments described above.

Additionally, in each of the embodiments described above, regarding the direction indicating switch, examples have been described such that a sealing member is attached to an operating cap which is attached to the operating section of a switch mechanism, and the operating cap or the sealing member as a plate member interferes in an inner wall surface of a peripheral wall part of a back case according to a tilt direction of the operating section. However, the direction indicating switch may be set to be as (1) to (3) below with the following in mind, and is not limited to each of the embodiments described above.

Firstly, a plate member 50 provided with the operating section of the switch mechanism (in each of the embodiments, the flange part 35, 352 and 353 of the operating cap 20 and 202 attached to the operating section 24) actually moves rotationally around a tilt axis of the operating section along with a tilt operation of the operating section. However, hereinafter, as illustrated in FIGS. 34A and 34B, for an easy understanding, it is assumed that the plate member 50 moves rotationally around a line passing on a reference line B1 on a bottom surface of the plate member 50 as an axis, since a concept is common.

(1)

Figure 34A:
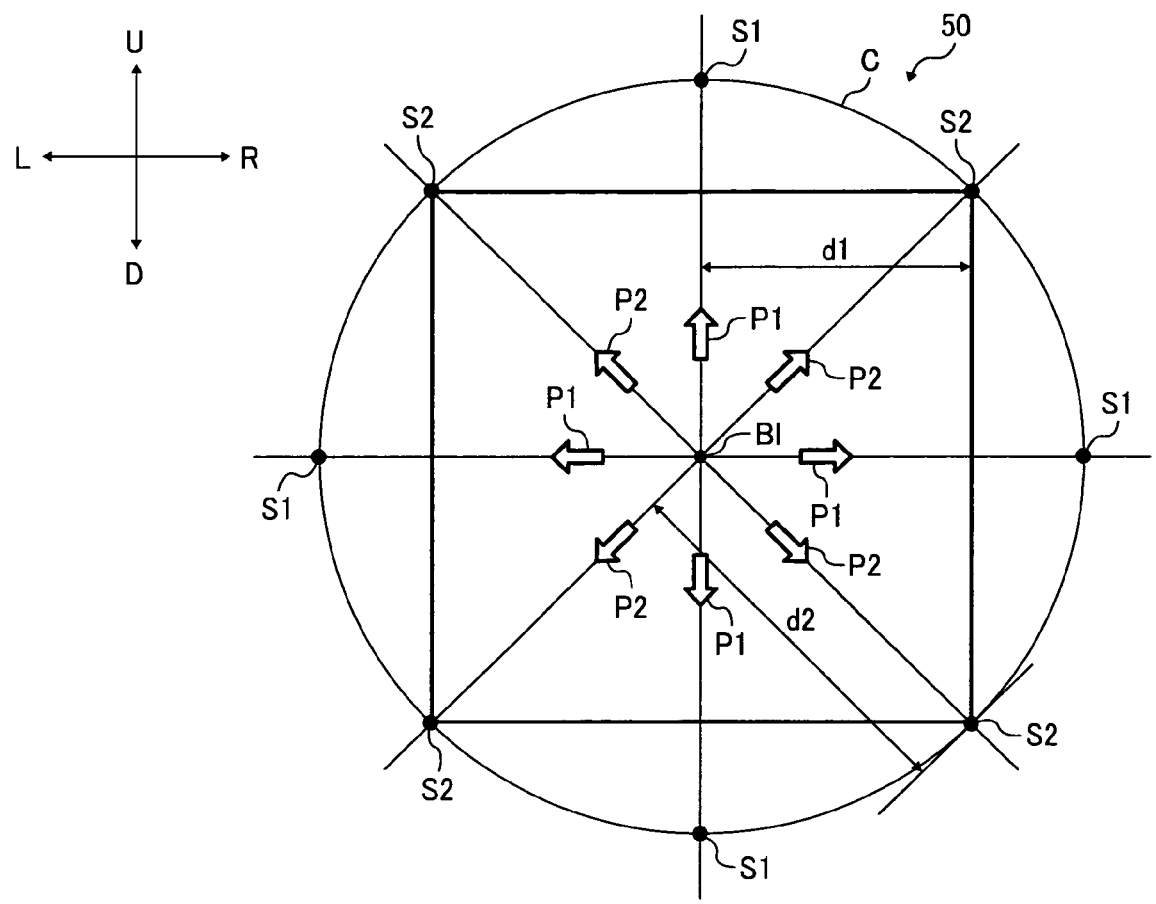
FIG. 34 is an explanatory view describing a relative relation between a plate member and an abutted surface part.
Figure 34B:
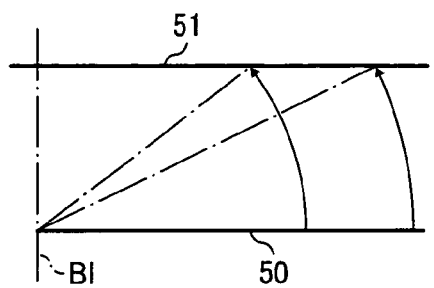

If the plate member 50 tilts in the radial direction at an equal angle to the reference line B1, a place on a circumference of a circle C with a certain radius length centering on the reference line B1 abuts on an abutted surface part 51 (See FIG. 34B) orthogonal to the reference line B1 (the inner wall part 13b of the back case 13 in each of the embodiments) (See FIG. 34A). That is, in each of the embodiments described above, if predetermined indicating directions are set to be up, down, right and left directions to the reference line B1, a spot in a point symmetry direction S1 abuts on the abutted surface part 51 when the plate member 50 tilts in an indicating direction P1, and a spot in a point symmetry direction S2 abuts on the abutted surface part 51 when the plate member 50 tilts in an indicating direction P2. Therefore, in the place on the circumference of the circle C, at each spot in the point symmetry direction S2, an interval between the plate member 50 and the abutted surface part 51 may be set so that the plate member 50 and the abutted surface part 51 may abut on each other before the operating section 24 tilts at a predetermined angle, and at each spot in the point symmetry direction S1, an interval between the plate member 50 and the abutted surface part 51 may be set so that the plate member 50 and the abutted surface part 51 may not abut on each other at least until the operating section 24 tilts at a predetermined angle. The direction indicating switch 18 according to the embodiment 1 corresponds to this example.

(2)

If an interval between the plate member 50 and the abutted surface part 51 orthogonal to the reference line B1 (the inner wall surface 13b of the back case 13 in each of the embodiments) is a certain one, compared to a case where the plate member 50 and the abutted surface part 51 abut on each other at a place close to the reference line B1, in a case where the plate member 50 and the abutted surface part 51 abut on each other at a place away from the reference line B1, a tilt of the plate member 50 is stopped at a smaller inclination angle to the reference line B1 (See FIG. 34B). Therefore, in a direction point-symmetric to the reference line B1 of the indicating direction P2 (the direction different from the predetermined direction), an interval between the abutted spot from the reference line B1 may be set so that the plate member 50 and the abutted surface part 51 may abut on each other before the operating section 24 tilts at the predetermined angle, and at a spot in a direction point symmetric to the reference line B1 of the indicating direction P1 (the predetermined direction), the interval between the abutted spot from the reference line B1 may be set so that the plate member 50 and the abutted surface part 51 may not abut on each other at least until the operating section 24 tilts at the predetermined angle. In other words, if the plate member 50 and the abutted surface part 51 abut on each other on a surface defined by straight lines connecting with each spot in the point symmetry direction S2 (a square), in a case where the plate member 50 tilts in the indicating direction P1, a spot where the straight lines connecting with each spot in the point symmetry direction S2 in an opposite place across the reference line B1 in the plate member 50 abuts on the abutted surface part 51, and an interval between the reference line B1 (a tilt axis) in the plate member 50 and an abutted spot is d1. And in a case where the plate member 50 tilts in the indicating direction P2, the plate member 50 and the abutted surface part 51 abut at each spot in the point symmetry direction S2 in an opposite place across the reference line B1, and an interval between the reference line B1 (the tilt axis) in the plate member 50 and an abutted spot is d2 (>d1) and a tilt angle in the indicating direction P2 becomes smaller. The direction indicating switch 183 according to the embodiment 3 corresponds to this example.

(3)

(1) and (2) described above are combined accordingly. The direction indicating switch 182 according to the embodiment 2 corresponds to this example.

In addition, in each of the embodiments described above, the four indicating directions such as up, down, right and left directions are set to the direction indicating switch. However, if the operating section is capable of tilting in the radial direction from the reference position and specifies the predetermined indicating direction by tilting in the predetermined direction over the predetermined angle from the reference position, the number of the predetermined indicating directions to be set may be indefinite and is not limited to each of the embodiments described above.

In each of the embodiments described above, in the direction indicating switch, a center position of the operating section is pressed down along the reference line, and thereby the contact points (25a and 32a) which are different from the contact points when the tilt operation is performed are in a conductive state. However, a structure like this may be unnecessary, and is not limited to each of the embodiments described above.

In each of the embodiments described above, in the switching device 19, each contact point on the side of the base 25 provided on the switch base 23 and each contact point on the side of the operating section 32 provided on the operating section 24, which are facing each other, are structured to be in a conductive state by abutting on each other. However, if the operating section specifies the indicating direction to be in the conductive state by tilting in the predetermined indicating direction to the reference line, for example, a piezoelectric switch described as the known example may be provided in the switch base and the operating section may be tilted and thereby the operating section may press the piezoelectric switch to be in the conductive state, and the switching device is not limited to each of the embodiments described above.

Figure 35:
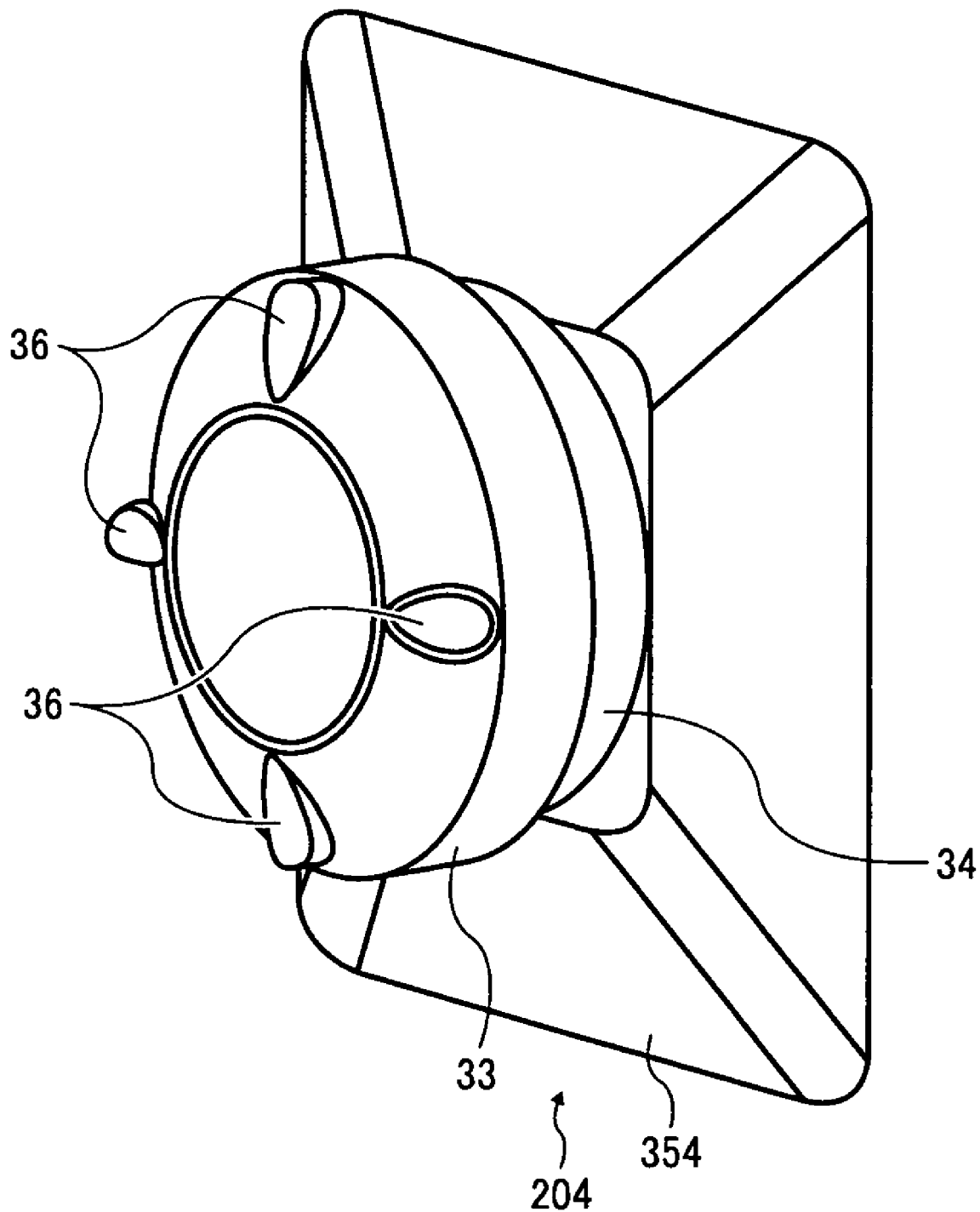
FIG. 35 is a schematic perspective view of a different operating cap from each embodiment.

In the direction indicating switch 182 according to the embodiment 2 and the direction indicating switch 183 according to the embodiment 3 described above, the operating cap 202 (See FIG. 13) is used. However, if an operating cap has a flange part which is capable of pressing a spot abutted on the inner wall surface 13b of the back case 13 in the sealing member 21 from a side of the switching device 19 (front side) toward the inner wall surface 13b, for example, the operating cap may be the operating cap 20' (See FIG. 10) according to the first variant example of the embodiment 1, or may be an operating cap 204 described in FIG. 35, and the operating cap is not limited to the embodiments 2 and 3. In a case of the flange part 352 of the operating cap 202, the ridge line parts are formed by the four inclined surfaces, however, here, the flange part 354 of this operating cap 204 has curved surfaces in which corners of the ridge line parts are cut away.

In the camera according to an embodiment of the present invention, if the operating section of the direction indicating switch performs a tilt operation in a direction different from a predetermined direction, the tilt controlling section controls to tilt in the direction different from the predetermined direction and thereby it is possible to prevent the operating section from tilting in an inappropriate direction, that is, it is possible to prevent a so-called operational error. Therefore, it is possible to prevent specifying an indicating direction against an operator's intention and prevent not specifying the indicating direction though the operating section is tilted.

Additionally, if the operation section of the direction indicating switch performs the tilt operation in the direction different from the predetermined indicating direction, the tilt controlling section prevents the operating section from tilting over a predetermined angle in the direction different from the predetermined indicating direction, and thereby it is possible to prevent the operating section from tilting in the inappropriate direction, that is, it is possible to prevent a so-called operational error. Therefore, it is possible to prevent specifying an indicating direction against an operator's intention, and it is possible to prevent not specifying the indicating direction though the operating section is tilted.

In addition, the plate member and the abutted surface part may be set so as to abut on each other and so as not to abut on each other according to a tilt direction of the operating section, and thereby it is easily possible to prevent the operating section from tilting to a predetermined angle and to allow the operating section to tilt to the predetermined angle.

In addition, it is possible for the plate member and the abutted surface part to be set so as to abut on each other and so as not to abut on each other according to the tilt direction of the operating section by only providing accordingly the projected part on the plate member.

In addition, it is easily possible to achieve the direction indicating switch by attaching the operating cap to an operating section of a general switching device which is capable of specifying an arbitrary indicating direction by a tilt operation of its operating section.

In addition, the sealing member is pressed against the peripheral wall part of the case member, via the flange part of the operating cap which is tilted with the operating section, to control the tilt of the operating section, and is elastic-deformable. Therefore, for example, in a case where the operating section is tilted in the direction different from the predetermined indicating direction, if the sealing member abuts on the peripheral wall part, the operating section does not immediately stop tilting. And as a tilt angle from the reference position becomes larger, it is possible for a reaction force to the tilt operation to become gradually larger. Therefore, when a user of the camera performs the tilt operation on the operating section of the direction indicating switch, it is possible for the user to recognize whether the tilt direction is appropriate or not by a difference of the reaction force from the operating section.

In addition, it is possible to prevent a relative displacement of the operating cap and the sealing member and to control properly a tilt range of the operating section by pressing the flange projected part of the flange part of the operating cap against the abutted surface part with the sealing member between the flange projected part and the abutted surface part.

Moreover, it is possible to prevent a gap between the operating section and the operating cap from being recognized visually.

Furthermore, it is possible for a user to operate the camera easily just as the user intended.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A camera comprising:
    an operating switch which sends an instruction to a controlling mechanism, wherein
    the operating switch includes:
    an operating section which is capable of tilting in an arbitrary radial direction from a reference position in order to specify an arbitrary indicating direction;
    a switching section which switches a conductive state of a contact point connecting with the controlling mechanism by tilting of the operating section in a predetermined indicating direction in the arbitrary radial direction; and
    a tilt controlling section which controls a tilt angle when the operating section tilts in a direction different from the predetermined indicating direction.

2. The camera according to claim 1, wherein
    the tilt controlling section prevents the tilt angle from exceeding a predetermined angle when the operating section tilts in the direction different from the predetermined indicating direction.

3. The camera according to claim 2, wherein
    when the operating section is tilted over the predetermined angle in the predetermined indicating direction, the contact point of the operating section is in a conductive state, and when the operating section is tilted in the direction different from the predetermined indicating direction, the contact point of the operating section is in a nonconductive state.

4. The camera according to claim 2, wherein
    the operating switch is a direction indicating switch and attached to a case member and, wherein
    the direction indicating switch includes:
    a switch base having a contact point which holds tiltably the operating section for abutting intermittently of the contact point.

5. The camera according to claim 4, wherein
    the tilt controlling section includes:
    a plate member provided in the operating section so as to encircle the operating section on a surface orthogonal to an axis of the operating section; and
    an abutted surface part provided in the case member or the switch base to face and extend in parallel with the plate member when the operating section is at the reference position, wherein
    the plate member, when the operating section is tilted in the direction different from the predetermined indicating direction from the reference position, abuts on the abutted surface part and thereby prevents the operating section from tilting to the predetermined angle, and when the operating section is tilted in the predetermined indicating direction from the reference position, the plate member allows the operating section to tilt to the predetermined angle without abutting on the abutted surface part.

6. The camera according to claim 5, wherein
    a projected part projected toward the abutted surface part is provided in the direction different from the predetermined indicating direction viewed from the reference position on the plate member, and
    the projected part, when the operating section is tilted in the direction different from the predetermined indicating direction from the reference position, abuts on the abutted surface part and thereby prevents the operating section from tilting to the predetermined angle, and when the operating section is tilted in the predetermined indicating direction from the reference position, the projected part has a length which allows the operating section to tilt to the predetermined angle without abutting on the abutted surface part.

7. The camera according to claim 5, wherein
    an operating cap is attached to the operating section so as to cover an end of the operating section,
    the operating cap including:
    a head part for operation exposed outward from an opening provided in the case member; and
    a flange part extending continuously from the head part for operation and along the case member inside of the case member, wherein
    the flange part forms the plate member, and a peripheral wall part which determines the opening in the case member forms the abutted surface part.

8. The camera according to claim 7, wherein
    a shielding member, having a projected stand part which is capable of fitting into the opening of the case member, is provided between the operating section and the operating cap,
    a through-hole having a diameter which is smaller than the head part for operation of the operating cap is provided in the projected stand part, and
    the flange part of the operating cap is capable of being inserted in the through-hole of the projected stand part and has an uneven diameter which is capable of engaging with the through-hole.

9. The camera according to claim 5, wherein
an operating cap is attached to the operating section so as to cover an end of the operating section,
the operating cap including:
a head part for operation exposed outward from an opening provided in the case member; and
a flange part extending continuously from the head part for operation and along the case member inside of the case member, wherein
the operating cap attaches a sealing member, which is formed by an elastic-deformable material to seal a gap between the opening and the operating cap, and which encircles the head part for operation and extends between the flange part and the case member, and
the sealing member forms the plate member, and a peripheral wall part which determines the opening in the case member forms the abutted surface part.

10. The camera according to claim 9, wherein
a flange projected part projected toward the abutted surface part is provided in a position of an opposite direction to the predetermined indicating direction viewed from the reference position on the flange part.

11. The camera according to claim 2, wherein
the predetermined indicating direction includes four directions orthogonal to each other viewed from the reference position.

12. An operating switch which sends an instruction to a controlling mechanism comprising:
an operating section which is capable of tilting in an arbitrary radial direction from a reference position in order to specify an arbitrary indicating direction;
a switching section which switches a conductive state of a contact point connecting with the controlling mechanism by tilting in a predetermined indicating direction from a reference position of the operating section in a predetermined indicating direction in the arbitrary radial direction; and
a tilt controlling section which controls a tilt of the operating section angle in a case where the operating section tilts in a direction different from the predetermined indicating direction, wherein
the tilt controlling section prevents the tilt angle from exceeding a predetermined angle in the case where the operating section tilts in the direction different from the predetermined indicating direction.

13. The operating switch according to claim 12, wherein
the operating section, when the operating section is tilted over the predetermined angle in the predetermined indicating direction, makes the contact point be in a conductive state, and when the operating section is tilted in the direction different from the predetermined indicating direction, the operating section makes the contact point be in a nonconductive state.

14. A direction indicating switch to specify an arbitrary indicating direction comprising:
a switch base having a contact point which is capable of abutting intermittently;
an operating section held by the switch base to be capable of tilting for abutting intermittently of the contact point; and
a tilt controlling section which controls a tilt of the operating section, wherein
the operating section is capable of tilting in a radial direction from a reference position where the operating section makes the contact point be in a nonconductive state, and when the operating section is tilted over a predetermined angle in a predetermined indicating direction from the reference position, the operating section makes the contact point be in a conductive state, and
the tilt controlling section allows the operating section to tilt over the predetermined angle in the predetermined indicating direction from the reference position and prevents the operating section from tilting over the predetermined angle in a direction different from the predetermined indicating direction from the reference position.

* * * * *